US010211740B2

(12) United States Patent
Zhu et al.

(10) Patent No.: US 10,211,740 B2
(45) Date of Patent: Feb. 19, 2019

(54) SYSTEMS AND METHODS FOR HIGH PRECISION AND/OR LOW LOSS REGULATION OF OUTPUT CURRENTS OF POWER CONVERSION SYSTEMS

(71) Applicant: ON-BRIGHT ELECTRONICS (SHANGHAI) CO., LTD., Shanghai (CN)

(72) Inventors: Liqiang Zhu, Shanghai (CN); Jiqing Yang, Shanghai (CN); Yaozhang Chen, Shanghai (CN); Zhuoyan Li, Shanghai (CN); Qiang Luo, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 15/429,011

(22) Filed: Feb. 9, 2017

(65) Prior Publication Data
US 2017/0214328 A1 Jul. 27, 2017

Related U.S. Application Data

(62) Division of application No. 13/969,281, filed on Aug. 16, 2013, now Pat. No. 9,614,445.

(30) Foreign Application Priority Data

Jul. 19, 2013 (CN) .......................... 2013 1 0306106

(51) Int. Cl.
*H02M 3/335* (2006.01)
*H02M 1/08* (2006.01)
(Continued)

(52) U.S. Cl.
CPC ......... *H02M 3/33507* (2013.01); *H02M 1/08* (2013.01); *H05B 33/0815* (2013.01);
(Continued)

(58) Field of Classification Search
CPC ......... H02M 3/33507; H02M 3/33515; H02M 3/33576; H02M 3/33592; H02M 3/33523
(Continued)

(56) References Cited

U.S. PATENT DOCUMENTS 3,018,966 A 5/1955 Zelina
3,913,002 A 10/1975 Steigerwald et al.
(Continued)

FOREIGN PATENT DOCUMENTS

CN 2552047 Y 5/2003
CN 1430314 A 7/2003
(Continued)

OTHER PUBLICATIONS

Chinese Patent Office, Office Action dated Aug. 31, 2017, in Application No. 201510249026.4.
(Continued)

*Primary Examiner* — Nguyen Tran
(74) *Attorney, Agent, or Firm* — Faegre Baker Daniels LLP

(57) ABSTRACT

Systems and methods are provided for signal processing. An example error amplifier for processing a reference signal and an input signal associated with a current of a power conversion system includes a first operational amplifier, a second operational amplifier, a first transistor, a second transistor, a current mirror component, a switch, a first resistor and a second resistor. The first operational amplifier includes a first input terminal, a second input terminal and a first output terminal, the first input terminal being configured to receive a reference signal. The first transistor includes a first transistor terminal, a second transistor terminal and a third transistor terminal, the first transistor terminal being configured to receive a first amplified signal
(Continued)

from the first output terminal, the third transistor terminal being coupled to the second input terminal.

16 Claims, 19 Drawing Sheets

(51) Int. Cl.
   *H05B 33/08* (2006.01)
   *H02M 1/36* (2007.01)
   *H02M 1/00* (2006.01)

(52) U.S. Cl.
   CPC ...... *H02M 1/36* (2013.01); *H02M 2001/0009* (2013.01); *H02M 2001/0022* (2013.01); *H05B 33/0818* (2013.01)

(58) Field of Classification Search
   USPC .. 363/20, 21.04, 21.05, 21.07, 21.08, 21.09, 363/21.1, 21.11, 21.12, 3, 21.15–21.18
   See application file for complete search history.

(56) References Cited

U.S. PATENT DOCUMENTS

| | | | |
|---|---|---|---|
| 3,967,173 A | 6/1976 | Stich | |
| 4,356,542 A | 10/1982 | Bruckner et al. | |
| 4,753,079 A | 6/1988 | Sumitomo | |
| 4,952,853 A | 8/1990 | Archer | |
| 4,975,820 A | 12/1990 | Szepesi | |
| 5,416,689 A | 5/1995 | Silverstein et al. | |
| 5,442,538 A | 8/1995 | Ikeda et al. | |
| 5,528,483 A | 6/1996 | Mohandes | |
| 5,550,702 A | 8/1996 | Schmidt et al. | |
| 5,574,392 A | 11/1996 | Jordan | |
| 5,578,908 A | 11/1996 | Persson | |
| 5,677,606 A | 10/1997 | Otake | |
| 5,796,595 A | 8/1998 | Cross | |
| 5,796,598 A | 8/1998 | Nowak et al. | |
| 5,867,379 A | 2/1999 | Maksimovic et al. | |
| 5,917,714 A | 6/1999 | Ogawa | |
| 6,061,257 A | 5/2000 | Spampinato et al. | |
| 6,084,783 A | 7/2000 | Rascon Martinez et al. | |
| 6,292,376 B1 | 9/2001 | Kato | |
| 6,469,917 B1 | 10/2002 | Ben-Yaakov | |
| 6,515,876 B2 | 2/2003 | Koike et al. | |
| 6,583,610 B2 | 6/2003 | Groom et al. | |
| 6,611,439 B1 | 8/2003 | Yang et al. | |
| 6,714,425 B2 | 3/2004 | Yamada et al. | |
| 6,737,845 B2 | 5/2004 | Hwang | |
| 6,839,247 B1 | 1/2005 | Yang et al. | |
| 6,842,350 B2 | 1/2005 | Yamada et al. | |
| 6,903,536 B2 | 6/2005 | Yang | |
| 6,914,789 B2 | 7/2005 | Kinoshita et al. | |
| 6,947,298 B2 | 9/2005 | Uchida | |
| 6,954,367 B2 | 10/2005 | Yang et al. | |
| 7,027,313 B2 | 4/2006 | Amei | |
| 7,061,225 B2 | 6/2006 | Yang et al. | |
| 7,099,164 B2 | 8/2006 | Zhu et al. | |
| 7,149,098 B1 | 12/2006 | Chen | |
| 7,342,383 B1 | 3/2008 | Song et al. | |
| 7,362,592 B2 | 4/2008 | Yang et al. | |
| 7,362,593 B2 | 4/2008 | Yang et al. | |
| 7,391,630 B2 | 6/2008 | Acatrinei | |
| 7,394,634 B2 | 7/2008 | Fang et al. | |
| 7,679,938 B2 | 3/2010 | Ye et al. | |
| 7,684,220 B2 | 3/2010 | Fang et al. | |
| 7,719,249 B2 | 5/2010 | Matyas et al. | |
| 7,738,227 B2 | 6/2010 | Fang et al. | |
| 7,746,615 B2 | 6/2010 | Zhu et al. | |
| 7,759,891 B2 | 7/2010 | Serizawa et al. | |
| 7,778,049 B2 | 8/2010 | Morota | |
| 7,791,903 B2 | 9/2010 | Zhang et al. | |
| 8,004,112 B2 | 8/2011 | Koga et al. | |
| 8,018,743 B2 | 9/2011 | Wang et al. | |
| 8,018,745 B2 | 9/2011 | Fang et al. | |
| 8,098,502 B2 | 1/2012 | Mao et al. | |
| 8,102,676 B2 | 1/2012 | Huyhn et al. | |
| 8,416,596 B2 | 4/2013 | Huang | |
| 8,482,946 B2 | 7/2013 | Fang et al. | |
| 8,488,342 B2 | 7/2013 | Zhang et al. | |
| 8,508,142 B2 | 8/2013 | Lin et al. | |
| 8,519,691 B2 | 8/2013 | McCloy-Stevens | |
| 8,559,152 B2 | 10/2013 | Cao et al. | |
| 8,680,884 B2 | 3/2014 | Chobot | |
| 8,824,167 B2 | 9/2014 | Hughes et al. | |
| 8,824,173 B2 | 9/2014 | Fang et al. | |
| 8,917,527 B2 | 12/2014 | Fang et al. | |
| 9,088,218 B2 | 7/2015 | Zhang et al. | |
| 9,136,703 B2 | 9/2015 | Cummings | |
| 9,362,737 B2 | 6/2016 | Yang et al. | |
| 9,401,648 B2 | 7/2016 | Li | |
| 9,548,652 B2 | 1/2017 | Cao et al. | |
| 9,553,501 B2 | 1/2017 | Yao et al. | |
| 9,564,811 B2 | 2/2017 | Zhai et al. | |
| 9,570,986 B2 | 2/2017 | Zhai et al. | |
| 9,577,536 B2 | 2/2017 | Yang et al. | |
| 9,584,005 B2 | 2/2017 | Fang | |
| 9,614,445 B2 | 4/2017 | Zhu et al. | |
| 9,647,448 B2 | 5/2017 | Fang et al. | |
| 9,960,674 B2 | 5/2018 | Fang et al. | |
| 9,991,802 B2 | 6/2018 | Zhai et al. | |
| 2002/0131279 A1 | 9/2002 | Tang | |
| 2003/0099119 A1 | 5/2003 | Yamada et al. | |
| 2003/0156433 A1 | 8/2003 | Gong et al. | |
| 2003/0174520 A1 | 9/2003 | Bimbaud | |
| 2004/0201369 A1 | 10/2004 | Perrier et al. | |
| 2004/0218405 A1 | 11/2004 | Yamada et al. | |
| 2005/0036342 A1 | 2/2005 | Uchida | |
| 2005/0099164 A1 | 5/2005 | Yang | |
| 2006/0055433 A1 | 3/2006 | Yang et al. | |
| 2006/0291258 A1 | 12/2006 | Zhu et al. | |
| 2008/0198638 A1 | 8/2008 | Reinberger et al. | |
| 2008/0257397 A1 | 10/2008 | Glaser et al. | |
| 2008/0298099 A1 | 12/2008 | Huang et al. | |
| 2008/0309380 A1 | 12/2008 | Yang et al. | |
| 2008/0316781 A1 | 12/2008 | Liu | |
| 2009/0021233 A1 | 1/2009 | Hsu | |
| 2009/0128113 A1 | 5/2009 | Ryoo | |
| 2009/0219070 A1 | 9/2009 | Zhang et al. | |
| 2010/0123447 A1 | 5/2010 | Vecera et al. | |
| 2010/0253250 A1 | 10/2010 | Marvelly et al. | |
| 2010/0328831 A1 | 12/2010 | Zhang et al. | |
| 2011/0101953 A1 | 5/2011 | Cheng et al. | |
| 2011/0110126 A1 | 5/2011 | Morrish | |
| 2011/0169418 A1* | 7/2011 | Yang | H05B 33/0815 315/291 |
| 2012/0008352 A1 | 1/2012 | Huang et al. | |
| 2012/0075891 A1 | 3/2012 | Zhang et al. | |
| 2012/0119650 A1 | 5/2012 | Lee | |
| 2012/0147630 A1 | 6/2012 | Cao et al. | |
| 2012/0194227 A1 | 8/2012 | Lin et al. | |
| 2012/0224397 A1 | 9/2012 | Yeh | |
| 2012/0281438 A1 | 11/2012 | Fang et al. | |
| 2013/0003421 A1 | 1/2013 | Fang | |
| 2013/0100715 A1 | 4/2013 | Lin et al. | |
| 2013/0135775 A1 | 5/2013 | Yao et al. | |
| 2013/0181635 A1 | 7/2013 | Ling | |
| 2013/0223107 A1 | 8/2013 | Zhang et al. | |
| 2013/0258723 A1 | 10/2013 | Fang et al. | |
| 2013/0294121 A1 | 11/2013 | Fang et al. | |
| 2013/0336029 A1 | 12/2013 | Cao et al. | |
| 2014/0016366 A1 | 1/2014 | Su | |
| 2014/0029315 A1 | 1/2014 | Zhang et al. | |
| 2014/0085941 A1 | 3/2014 | Li et al. | |
| 2014/0355316 A1* | 12/2014 | Wu | H02M 3/335 363/21.16 |
| 2015/0023069 A1 | 1/2015 | Zhu et al. | |
| 2015/0055382 A1 | 2/2015 | Yang et al. | |
| 2015/0115919 A1 | 4/2015 | Yang et al. | |
| 2015/0180328 A1 | 6/2015 | Yao et al. | |
| 2015/0301542 A1* | 10/2015 | Yang | H02M 3/33592 323/280 |
| 2015/0303787 A1 | 10/2015 | Zhai et al. | |
| 2015/0303898 A1 | 10/2015 | Zhai et al. | |

(56) References Cited

U.S. PATENT DOCUMENTS

| | | |
|---|---|---|
| 2015/0340952 A1 | 11/2015 | Manohar et al. |
| 2015/0340957 A1 | 11/2015 | Fang et al. |
| 2015/0357912 A1 | 12/2015 | Perreault et al. |
| 2016/0226239 A1 | 8/2016 | Yang et al. |
| 2016/0336852 A1 | 11/2016 | Fang et al. |
| 2016/0336864 A1 | 11/2016 | Fang et al. |
| 2016/0336868 A1 | 11/2016 | Fang et al. |
| 2017/0141688 A1 | 5/2017 | Zhai et al. |
| 2017/0163026 A1 | 6/2017 | Yang et al. |
| 2017/0179808 A1 | 6/2017 | Zhai et al. |
| 2017/0187294 A1 | 6/2017 | Fang et al. |
| 2017/0194869 A1 | 7/2017 | Yao et al. |
| 2017/0214327 A1 | 7/2017 | Zhu et al. |
| 2018/0123448 A1 | 5/2018 | Yao et al. |
| 2018/0123456 A1 | 5/2018 | Fang et al. |
| 2018/0123464 A1 | 5/2018 | Fang et al. |

FOREIGN PATENT DOCUMENTS

| | | |
|---|---|---|
| CN | 2567850 Y | 8/2003 |
| CN | 1448005 A | 10/2003 |
| CN | 1459903 A | 12/2003 |
| CN | 1497827 A | 5/2004 |
| CN | 1815838 A | 8/2006 |
| CN | 1917322 A | 2/2007 |
| CN | 101079576 A | 11/2007 |
| CN | 101295872 A | 10/2008 |
| CN | 101340149 A | 1/2009 |
| CN | 101425750 A | 5/2009 |
| CN | 101499713 A | 8/2009 |
| CN | 101552570 | 10/2009 |
| CN | 100559678 C | 11/2009 |
| CN | 101662223 A | 3/2010 |
| CN | 101295872 B | 4/2010 |
| CN | 201477463 U | 5/2010 |
| CN | 101924536 A | 12/2010 |
| CN | 101964647 A | 2/2011 |
| CN | 101997412 A | 3/2011 |
| CN | 102202449 | 9/2011 |
| CN | 202009514 U | 10/2011 |
| CN | 102364990 A | 2/2012 |
| CN | 102412727 A | 4/2012 |
| CN | 102487246 A | 6/2012 |
| CN | 102545567 A | 7/2012 |
| CN | 102611306 A | 7/2012 |
| CN | 102624237 A | 8/2012 |
| CN | 102625514 A | 8/2012 |
| CN | 102638169 A | 8/2012 |
| CN | 102651613 A | 8/2012 |
| CN | 102761255 A | 10/2012 |
| CN | 102790531 A | 11/2012 |
| CN | 102801300 A | 11/2012 |
| CN | 102820781 A | 12/2012 |
| CN | 103036438 A | 4/2013 |
| CN | 103078489 | 5/2013 |
| CN | 103166198 | 6/2013 |
| CN | 103167665 A | 6/2013 |
| CN | 103178717 A | 6/2013 |
| CN | 103368400 A | 10/2013 |
| CN | 103401424 A | 11/2013 |
| CN | 103781256 A | 5/2014 |
| CN | 103781257 | 5/2014 |
| CN | 103887980 A | 6/2014 |
| CN | 103916027 A | 7/2014 |
| CN | 103956905 A | 7/2014 |
| CN | 203747681 | 7/2014 |
| CN | 103986336 A | 8/2014 |
| CN | 104022648 | 9/2014 |
| CN | 104617792 A | 5/2015 |
| CN | 104853493 A | 8/2015 |
| CN | 104967328 A | 10/2015 |
| EP | 0871328 B1 | 8/2003 |
| EP | 1317052 B1 | 10/2006 |
| JP | 2003-333839 A | 11/2003 |
| JP | 2006-237519 A | 9/2006 |
| JP | 2006-237619 A | 9/2006 |
| JP | 4064296 | 3/2008 |
| JP | 2009-36750 A | 2/2009 |
| TV | 200929824 | 7/2009 |
| TW | M400069 | 3/2011 |
| TW | 201117670 | 5/2011 |
| TW | 201218860 | 5/2012 |
| TW | 201225495 | 6/2012 |
| TW | 201241591 | 10/2012 |
| TW | 201325304 | 6/2013 |
| TW | I403875 | 8/2013 |
| TW | I434500 | 4/2014 |
| TW | 201429132 | 7/2014 |
| TW | I458232 | 10/2014 |
| TW | 201541845 | 11/2015 |
| WO | WO 2012/147453 | 11/2012 |

OTHER PUBLICATIONS

United States Patent and Trademark, Notice of Allowance dated Sep. 6, 2017, in U.S. Appl. No. 14/753,079.
United States Patent and Trademark, Notice of Allowance dated Sep. 6, 2017, in U.S. Appl. No. 14/974,695.
United States Patent and Trademark, Office Action dated Aug. 24, 2017, in U.S. Appl. No. 15/371,058.
United States Patent and Trademark, Office Action dated Oct. 5, 2017, in U.S. Appl. No. 15/374,896.
United States Patent and Trademark, Office Action dated Nov. 8, 2017, in U.S. Appl. No. 15/380,693.
United States Patent and Trademark, Office Action dated Oct. 23, 2017, in U.S. Appl. No. 15/400,469.
United States Patent and Trademark, Office Action dated Sep. 19, 2017, in U.S. Appl. No. 15/428,996.
Chinese Patent Office, Office Action dated Apr. 5, 2017, in Application No. 201510413940.8.
Chinese Patent Office, Office Action dated Jun. 21, 2017, in Application No. 201510788449.3.
United States Patent and Trademark, Notice of Allowance dated Jun. 1, 2017, in U.S. Appl. No. 14/753,079.
United States Patent and Trademark, Notice of Allowance dated Jun. 23, 2017, in U.S. Appl. No. 14/974,694.
United States Patent and Trademark, Office Action dated Jun. 27, 2017, in U.S. Appl. No. 15/055,261.
United States Patent and Trademark, Office Action dated Jun. 28, 2017, in U.S. Appl. No. 14/638,191.
United States Patent and Trademark, Office Action dated Jul. 25, 2017, in U.S. Appl. No. 15/362,268.
Chinese Patent Office, Office Action dated Aug. 1, 2014, in Application No. 201310015152.4.
Chinese Patent Office, Office Action dated Jan. 17, 2014, in Application No. 201310306106.X.
Chinese Patent Office, Office Action dated Jan. 3, 2014, in Application No. 201010587658.9.
Chinese Patent Office, Office Action dated Nov. 26, 2015, in Application No. 201410134395.4.
Chinese Patent Office, Office Action dated Dec. 4, 2015, in Application No. 201410198140.4.
Chinese Patent Office, Office Action dated Jan. 25, 2016, in Application No. 201410157557.6.
Chinese Patent Office, Office Action dated Aug. 17, 2016, in Application No. 201510053255.9.
Chinese Patent Office, Office Action dated Nov. 2, 2016, in Application No. 201510249026.4.
Taiwan Intellectual Property Office, Office Action dated Mar. 13, 2014, in Application No. 100101960.
Taiwan Intellectual Property Office, Office Action dated May 5, 2015, in Application No. 102131370.
Taiwan Intellectual Property Office, Office Action dated May 18, 2016, in Application No. 103121063.
Taiwan Intellectual Property Office, Office Action dated May 24, 2016, in Application No. 104110694.
Taiwan Intellectual Property Office, Office Action dated May 23, 2016, in Application No. 104132444.

(56) References Cited

OTHER PUBLICATIONS

Taiwan Intellectual Property Office, Approval Report dated May 26, 2016, in Application No. 104125785.
Taiwan Intellectual Property Office, Office Action dated Jul. 29, 2016, in Application No. 105106390.
United States Patent and Trademark, Notice of Allowance dated Nov. 6, 2015, in U.S. Appl. No. 13/900,430.
United States Patent and Trademark, Notice of Allowance dated Mar. 21, 2016, in U.S. Appl. No. 13/900,430.
United States Patent and Trademark, Notice of Allowance dated Jul. 11, 2016, in U.S. Appl. No. 13/900,430.
United States Patent and Trademark, Notice of Allowance dated Sep. 28, 2016, in U.S. Appl. No. 13/900,430.
United States Patent and Trademark, Notice of Allowance dated Feb. 23, 2017, in U.S. Appl. No. 14/753,079.
United States Patent and Trademark, Office Action dated May 14, 2015, in U.S. Appl. No. 13/900,430.
United States Patent and Trademark, Office Action dated Oct. 30, 2015, in U.S. Appl. No. 13/969,281.
United States Patent and Trademark, Office Action dated May 24, 2016, in U.S. Appl. No. 13/969,281.
United States Patent and Trademark, Notice of Allowance dated Nov. 22, 2016, in U.S. Appl. No. 13/969,281.
United States Patent and Trademark, Office Action dated Jul. 12, 2016, in U.S. Appl. No. 14/753,079.
United States Patent and Trademark, Notice of Allowance dated Mar. 15, 2018, in U.S. Appl. No. 14/638,191.
United States Patent and Trademark, Notice of Allowance dated Mar. 27, 2018, in U.S. Appl. No. 15/371,058.
United States Patent and Trademark, Office Action dated Jun. 15, 2018, in U.S. Appl. No. 15/374,896.
United States Patent and Trademark, Notice of Allowance dated May 10, 2018, in U.S. Appl. No. 15/400,469.
United States Patent and Trademark, Notice of Allowance dated Jun. 22, 2018, in U.S. Appl. No. 15/428,996.
United States Patent and Trademark, Office Action dated Jun. 29, 2018, in U.S. Appl. No. 15/804,712.
United States Patent and Trademark, Notice of Allowance dated Jul. 17, 2018, in U.S. Appl. No. 15/815,468.
United States Patent and Trademark, Office Action dated May 4, 2018, in U.S. Appl. No. 15/852,490.
Chinese Patent Office, Office Action dated Dec. 5, 2017, in Application No. 201410157557.6.
United States Patent and Trademark, Notice of Allowance dated Nov. 30, 2017, in U.S. Appl. No. 14/638,191.
United States Patent and Trademark, Notice of Allowance dated Dec. 22, 2017, in U.S. Appl. No. 15/055,261.
United States Patent and Trademark, Notice of Allowance dated Dec. 8, 2017, in U.S. Appl. No. 15/362,268.
United States Patent and Trademark, Office Action dated Jan. 24, 2018, in U.S. Appl. No. 15/428,996.
Chinese Patent Office, Office Action dated Aug. 22, 2018, in Application No. 201710147830.0.
United States Patent and Trademark, Notice of Allowance dated Sep. 28, 2018, in U.S. Appl. No. 14/974,695.
United States Patent and Trademark, Notice of Allowance dated Oct. 11, 2018, in U.S. Appl. No. 15/374,896.
United States Patent and Trademark, Notice of Allowance dated Aug. 14, 2018, in U.S. Appl. No. 15/380,693.
United States Patent and Trademark, Notice of Allowance dated Aug. 31, 2018, in U.S. Appl. No. 15/400,469.
United States Patent and Trademark, Notice of Allowance dated Aug. 16, 2018, in U.S. Appl. No. 15/428,996.
United States Patent and Trademark, Notice of Allowance dated Sep. 17, 2018, in U.S. Appl. No. 15/815,468.
United States Patent and Trademark, Office Action dated Oct. 4, 2018, in U.S. Appl. No. 15/852,490.
United States Patent and Trademark, Office Action dated Aug. 31, 2018, in U.S. Appl. No. 15/927,790.
United States Patent and Trademark, Office Action dated Nov. 1, 2018, in U.S. Appl. No. 16/014,337.
United States Patent and Trademark, Office Action dated Nov. 29, 2018, in U.S. Appl. No. 16/008,343.

\* cited by examiner

SYSTEMS AND METHODS FOR HIGH PRECISION AND/OR LOW LOSS REGULATION OF OUTPUT CURRENTS OF POWER CONVERSION SYSTEMS

1. CROSS-REFERENCES TO RELATED APPLICATIONS

This application is a divisional of U.S. patent application Ser. No. 13/969,281, filed Aug. 16, 2013, which claims priority to Chinese Patent Application No. 201310306106.X, filed Jul. 19, 2013, both of these applications being commonly assigned and incorporated by reference herein for all purposes.

2. BACKGROUND OF THE INVENTION

The present invention is directed to integrated circuits. More particularly, the invention provides a system and method for current regulation. Merely by way of example, the invention has been applied to power conversion systems. But it would be recognized that the invention has a much broader range of applicability.

Light emitting diodes (LEDs) are widely used for lighting applications. Oftentimes, the currents flowing through LEDs need to be approximately constant. The output-current precision of LEDs is usually used for determining the constant-current properties of a LED lighting system.

FIG. 1 is a simplified diagram showing a conventional power conversation system for LED lighting. The power conversion system 100 includes a controller 102, resistors 104, 124, 126 and 132, capacitors 106, 120 and 134, a diode 108, a transformer 110 including a primary winding 112, a secondary winding 114 and an auxiliary winding 116, a power switch 128, a current sensing resistor 130, and a rectifying diode 118. The controller 102 includes terminals 138, 140, 142, 144, 146 and 148. For example, the power switch 128 is a bipolar junction transistor. In another example, the power switch 128 is a MOS transistor.

An alternate-current (AC) input voltage 152 is applied to the system 100. A bulk voltage 150 (e.g., a rectified voltage no smaller than 0 V) associated with the AC input voltage 152 is received by the resistor 104. The capacitor 106 is charged in response to the bulk voltage 150, and a voltage 154 is provided to the controller 102 at the terminal 138 (e.g., terminal VCC). If the voltage 154 is larger than a predetermined threshold voltage (e.g., a under-voltage lock-out threshold) in magnitude, the controller 102 begins to operate normally, and outputs a driving signal 156 through the terminal 142 (e.g., terminal GATE). For example, the driving signal 156 is a pulse-width-modulation (PWM) signal with a switching frequency and a duty cycle. The switch 128 is closed (e.g., being turned on) or open (e.g., being turned off) in response to the driving signal 156 so that the output current 158 is regulated to be approximately constant.

The auxiliary winding 116 charges the capacitor 106 through the diode 108 when the switch 128 is closed (e.g., being turned on) in response to the driving signal 156 so that the controller 102 can operate normally. A feedback signal 160 is provided to the controller 102 through the terminal 140 (e.g., terminal FB) in order to detect the ending of a demagnetization process of the secondary winding 118 for charging or discharging the capacitor 134 using an internal error amplifier in the controller 102. The resistor 130 is used for detecting a primary current 162 flowing through the primary winding 112, and a current-sensing signal 164 is provided to the controller 102 through the terminal 144 (e.g., terminal CS) to be processed during each switching cycle. Peak magnitudes of the current-sensing signal 164 are sampled and provided to the internal error amplifier. The capacitor 120 is used to keep an output voltage 168 stable.

FIG. 2 is a simplified conventional diagram showing the controller 102 as part of the system 100. The controller 102 includes an oscillator 202, an under-voltage lock-out (UVLO) component 204, a modulation component 206, a logic controller 208, a driving component 210, a demagnetization detector 212, an error amplifier 216, and a current-sensing component 214.

As shown in FIG. 2, the UVLO component 204 detects the signal 154 and outputs a signal 218. If the signal 154 is larger than a predetermined threshold in magnitude, the controller 102 begins to operate normally. If the signal 154 is smaller than the predetermined threshold in magnitude, the controller 102 is turned off. The error amplifier 216 receives a signal 220 from the current-sensing component 214 and a reference signal 222 and outputs an amplified signal 224 to the modulation component 206. The modulation component 206 also receives a signal 228 from the oscillator 202 and outputs a modulation signal 226 which is a PWM signal. For example, the signal 228 is a ramping signal and increases, linearly or non-linearly, to a peak magnitude during each switching period. In another example, the modulation signal 226 has a fixed switching frequency and the duty cycle of the signal 226 is determined based on a comparison between the signal 224 and the signal 228. The logic controller 208 processes the modulation signal 226 and outputs a control signal 230 to the driving component 210 which generates the signal 156 to turn on or off the switch 128. The demagnetization detector 212 detects the feedback signal 160 and outputs a signal 232 for determining the beginning and the end of the demagnetization process of the secondary winding 114.

FIG. 3 is a simplified conventional diagram showing the current-sensing component 214 and the error amplifier 216 as parts of the controller 102. The current-sensing component 214 includes a switch 302 and a capacitor 304. The error amplifier 216 includes switches 306 and 308, an operational amplifier 310.

As shown in FIG. 3, the current-sensing component 214 samples the current-sensing signal 164 and the error amplifier 216 amplifies the difference between the signal 220 and the reference signal 222. Specifically, the switch 302 is closed (e.g., being turned on) or open (e.g., being turned off) in response to a signal 314 in order to sample peak magnitudes of the current-sensing signal 164 in different switching periods. If the switch 302 is closed (e.g., being turned on) in response to the signal 314 and the switch 306 is open (e.g., being turned off) in response to the signal 232 from the demagnetization detector 212, the capacitor 304 is charged and the signal 220 increases in magnitude. If the switch 306 is closed (e.g., being turned on) in response to the signal 232, the switch 308 is open (e.g., being turned off) in response to a signal 312 and the difference between the signal 220 and the reference signal 222 is amplified by the amplifier 310. For example, during the demagnetization process of the secondary winding 114, the signal 232 is at a logic high level. The switch 306 remains closed (e.g., being turned on) and the switch 308 remains open (e.g., being turned off). The amplifier 310, together with the capacitor 134, performs integration associated with the signal 220.

Under stable normal operations, an average output current is determined, according to the following equation, without taking into account any error current:

$$\bar{I}_o = \frac{1}{2} \times N \times \frac{V_{ref\_ea}}{R_{cs}} \qquad \text{(Equation 1)}$$

where N represents a turns ratio between the primary winding 112 and the secondary winding 114, $V_{ref\_ea}$ represents the reference signal 222 and $R_{cs}$ represents the resistance of the resistor 130.

But the system 100 has problems in regulating the output current to be approximately constant. Hence it is highly desirable to improve the techniques of regulating output currents of power conversion systems.

3. BRIEF SUMMARY OF THE INVENTION

The present invention is directed to integrated circuits. More particularly, the invention provides a system and method for current regulation. Merely by way of example, the invention has been applied to power conversion systems. But it would be recognized that the invention has a much broader range of applicability.

According to one embodiment, an error amplifier for processing a reference signal and an input signal associated with a current of a power conversion system includes a first operational amplifier, a second operational amplifier, a first transistor, a second transistor, a current mirror component, a switch, a first resistor and a second resistor. The first operational amplifier includes a first input terminal, a second input terminal and a first output terminal, the first input terminal being configured to receive a reference signal. The first transistor includes a first transistor terminal, a second transistor terminal and a third transistor terminal, the first transistor terminal being configured to receive a first amplified signal from the first output terminal, the third transistor terminal being coupled to the second input terminal. The second operational amplifier includes a third input terminal, a fourth input terminal and a second output terminal, the third input terminal being configured to receive an input signal associated with a current flowing through a primary winding of a power conversion system. The second transistor includes a fourth transistor terminal, a fifth transistor terminal and a sixth transistor terminal, the fourth transistor terminal being configured to receive a second amplified signal from the second output terminal, the sixth transistor terminal being coupled to the fourth input terminal. The current mirror component includes a first component terminal and a second component terminal, the first component terminal being coupled to the second transistor terminal. The switch includes a first switch terminal and a second switch terminal, the first switch terminal being coupled to the second component terminal, the second switch terminal being coupled to the fifth transistor terminal. The first resistor includes a first resistor terminal and a second resistor terminal, the first resistor being associated with a first resistance, the first resistor terminal being coupled to the second input terminal. The second resistor includes a third resistor terminal and a fourth resistor terminal, the second resistor being associated with a second resistance, the third resistor terminal being coupled to the fourth input terminal. The first resistance is larger than the second resistance in magnitude. The second component terminal is configured to output an output signal based on at least information associated with the reference signal and the input signal.

According to another embodiment, a system controller for regulating a power conversion system includes a first controller terminal configured to receive a first voltage associated with a first current, the first current being related to an input voltage of a power conversion system, a compensation component coupled to the first controller terminal and configured to, if the first voltage satisfies one or more first conditions, generate a compensation current based on at least information associated with the first current, and a second controller terminal coupled to the compensation component and configured to provide a compensation voltage based on at least information associated with the compensation current, the compensation voltage being equal in magnitude to the compensation current multiplied by a compensation resistance, the compensation resistance being associated with a compensation resistor. The system controller further includes a current sensing component configured to receive a second voltage and generate an output signal, the second voltage being equal to a sum of a third voltage and the compensation voltage in magnitude, the third voltage being proportional to a second current flowing through a primary winding of the power conversion system, and an error amplifier configured to receive the output signal and a reference signal, generate an amplified signal based on at least information associated with the output signal and the reference signal, and output the amplified signal to affect a switch associated with the second current.

According to yet another embodiment, a system controller for regulating a power conversion system includes a first controller terminal configured to receive a feedback signal associated with an output voltage of a power conversion system, a compensation component coupled to the first controller terminal and configured to sample the feedback signal during a demagnetization process of the power conversion system and generate a compensation current based on at least information associated with the sampled feedback signal, and a second controller terminal coupled to the compensation component and configured to provide a compensation voltage based on at least information associated with the compensation current, the compensation voltage being equal in magnitude to the compensation current multiplied by a compensation resistance, the compensation resistance being associated with a compensation resistor. In addition, the system controller includes a current sensing component configured to receive an input voltage and generate an output signal, the input voltage being equal to a sum of a first voltage and the compensation voltage in magnitude, the first voltage being proportional to a first current flowing through a primary winding of the power conversion system, and an error amplifier configured to receive the output signal and a reference signal, generate an amplified signal based on at least information associated with the output signal and the reference signal, and output the amplified signal to affect a switch associated with the first current.

According to yet another embodiment, a system controller for regulating a power conversion system includes a first controller terminal configured to receive a feedback signal associated with an output voltage of a power conversion system, a compensation component coupled to the first controller terminal and configured to sample the feedback signal during a demagnetization process of the power conversion system and generate a compensation current based on at least information associated with the sampled feedback signal, and an error amplifier including a first input terminal, a second input terminal, and an output terminal coupled to the compensation component. The first input terminal is configured to receive an input voltage, the second input terminal is configured to receive a reference voltage, and the output terminal is configured to output a first output current related to a difference between the input voltage and the reference voltage in magnitude. The error amplifier and the compensation component are further configured to generate a second output current equal to a difference between the first output current and the compensation current in magnitude.

In one embodiment, a method for regulating a power conversion system includes receiving a first voltage associated with a first current, the first current being related to an input voltage of a power conversion system, generating, if the first voltage satisfies one or more first conditions, a compensation current based on at least information associated with the first current, and providing an compensation voltage based on at least information associated with the compensation current, the compensation voltage being equal in magnitude to the compensation current multiplied by a compensation resistance, the compensation resistance being associated with a compensation resistor. The method further includes receiving an input voltage, the input voltage being equal to a sum of a second voltage and the compensation voltage in magnitude, the second voltage being proportional to a second current flowing through a primary winding of the power conversion system, generating an output signal based on at least information associated with the input voltage, and receiving the output signal and a reference signal. In addition, the method includes generating an amplified signal based on at least information associated with the output signal and the reference signal, and outputting the amplified signal in order to affect a switch associated with the second current.

In another embodiment, a method for regulating a power conversion system includes receiving a feedback signal associated with an output voltage of a power conversion system, sampling the feedback signal during a demagnetization process of the power conversion system, and generating a compensation current based on at least information associated with the sampled feedback signal. The method further includes providing a compensation voltage based on at least information associated with the compensation current, the compensation voltage being equal in magnitude to the compensation current multiplied by a compensation resistance, the compensation resistance being associated with a compensation resistor, receiving an input voltage, the input voltage being equal to a sum of a first voltage and the compensation voltage in magnitude, the first voltage being proportional to a first current flowing through a primary winding of the power conversion system, and generating an output signal. In addition, the method includes receiving the output signal and a reference signal, generating an amplified signal based on at least information associated with the output signal and the reference signal, and outputting the amplified signal to affect a switch associated with the first current.

In yet another embodiment, a method for regulating a power conversion system includes receiving a feedback signal associated with an output voltage of a power conversion system, sampling the feedback signal during a demagnetization process of the power conversion system, and generating a compensation current based on at least information associated with the sampled feedback signal. Additionally, the method includes receiving an input voltage at a first input terminal of an error amplifier, and the error amplifier further includes a second input terminal and an output terminal. Moreover, the method includes receiving a reference voltage at the second input terminal, generating a first output current at the output terminal related to a difference between the input voltage and the reference voltage in magnitude, and outputting a second output current equal to a difference between the first output current and the compensation current in magnitude.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

The present invention is directed to integrated circuits. More particularly, the invention provides a system and method for current regulation. Merely by way of example, the invention has been applied to power conversion systems. But it would be recognized that the invention has a much broader range of applicability.

According to Equation 1, N, $R_{cs}$ and $V_{ref\_ea}$ may affect the precision of the constant output current. N and $R_{cs}$ are parameters of peripheral components, and can be selected through system design. Thus, the reference signal 222 affects significantly the precision of the constant output current. In actual applications, the average output current and the turns ratio of the transformer 110 are often predetermined, and thus the ratio between $R_{cs}$ and $V_{ref\_ea}$ is also approximately fixed. Therefore, the larger the reference signal 222 is in magnitude, the larger the resistance of the resistor 130 often. A large resistance of the resistor 130 results in large power loss, and thus the reference signal 222 may need to have a small magnitude for better efficiency. But non-ideal factors (e.g., offset errors, gain errors) may have larger negative effects on the precision of the constant output current if the reference signal 222 has a small magnitude.

Figure 4:
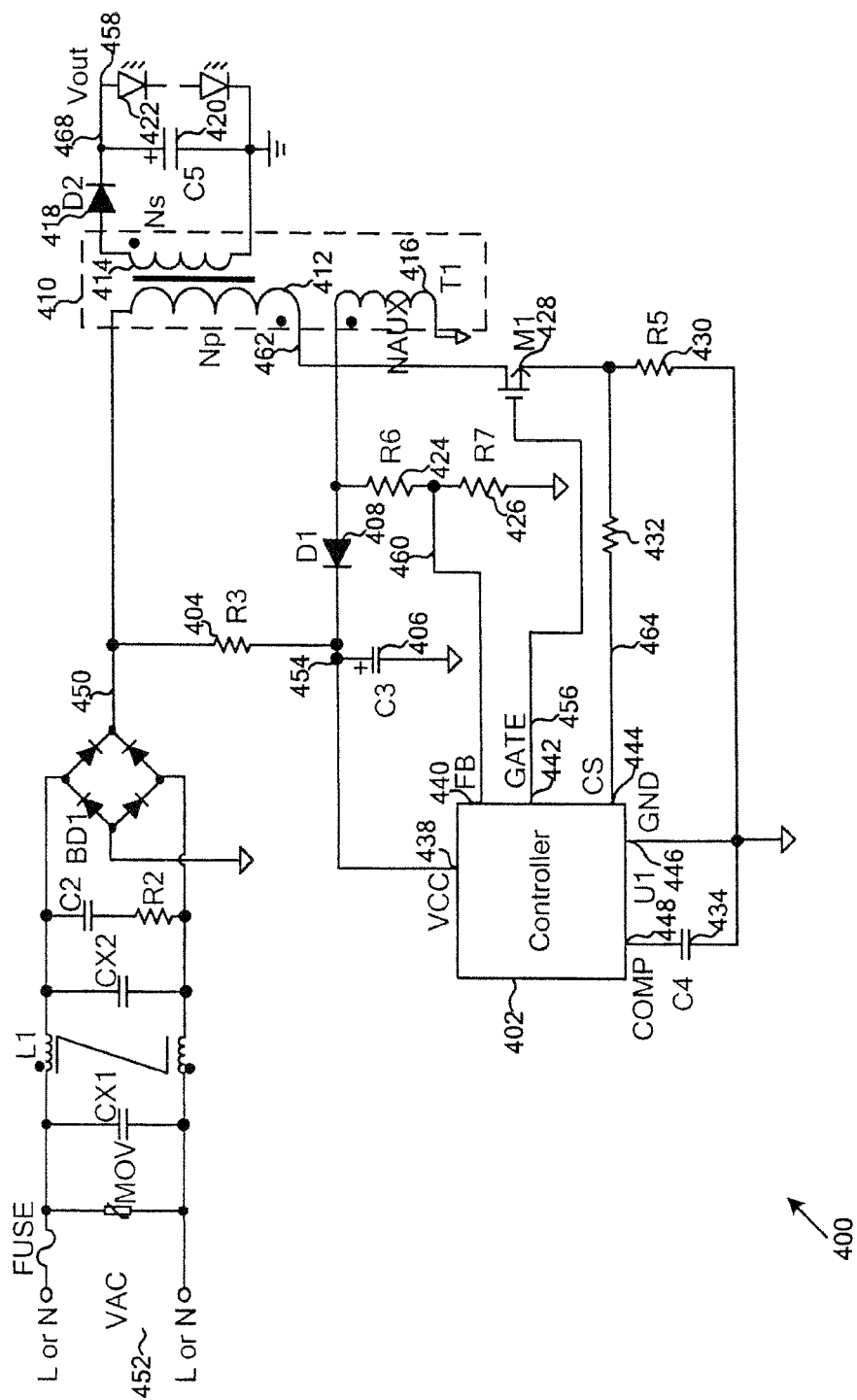
FIG. 4 is a simplified diagram showing a power conversion system according to an embodiment of the present invention.

FIG. 4 is a simplified diagram showing a power conversion system according to an embodiment of the present invention. This diagram is merely an example, which should not unduly limit the scope of the claims. One of ordinary skill in the art would recognize many variations, alternatives, and modifications. The system 400 includes a controller 402, resistors 404, 424, 426 and 432, capacitors 406, 420 and 434, a diode 408, a transformer 410 including a primary winding 412, a secondary winding 414 and an auxiliary winding 416, a power switch 428, a current sensing resistor 430, and a rectifying diode 418. The controller 402 includes terminals 438, 440, 442, 444, 446 and 448. For example, the power switch 428 is a bipolar junction transistor. In another example, the power switch 428 is a MOS transistor. The system 400 provides power to an output load 422, e.g., one or more LEDs.

According to one embodiment, an alternate-current (AC) input voltage 452 is applied to the system 400. For example, a bulk voltage 450 (e.g., a rectified voltage no smaller than 0 V) associated with the AC input voltage 452 is received by the resistor 404. In another example, the capacitor 406 is charged in response to the bulk voltage 450, and a voltage 454 is provided to the controller 402 at the terminal 438 (e.g., terminal VCC). In yet another example, if the voltage 454 is larger than a predetermined threshold voltage (e.g., a under-voltage lock-out threshold) in magnitude, the controller 402 begins to operate normally, and outputs a driving signal 456 through the terminal 442 (e.g., terminal GATE). In yet another example, the switch 428 is closed (e.g., being turned on) or open (e.g., being turned off) in response to the driving signal 456 so that the output current 458 is regulated to be approximately constant.

According to another embodiment, the auxiliary winding 416 charges the capacitor 406 through the diode 408 when the switch 428 is closed (e.g., being turned on) in response to the driving signal 456 so that the controller 402 can operate normally. For example, a feedback signal 460 is provided to the controller 402 through the terminal 440 (e.g., terminal FB) in order to detect the ending of a demagnetization process of the secondary winding 418 for charging or discharging the capacitor 434 using an internal error amplifier in the controller 402. In another example, the resistor 430 is used for detecting a primary current 462 flowing through the primary winding 412, and a current-sensing signal 464 is provided to the controller 402 through the terminal 444 (e.g., terminal CS) to be processed during each switching cycle. In yet another example, peak magnitudes of the current-sensing signal 464 are sampled and provided to the internal error amplifier. In yet another example, the capacitor 420 is used to keep an output voltage 468 stable.

Figure 13:
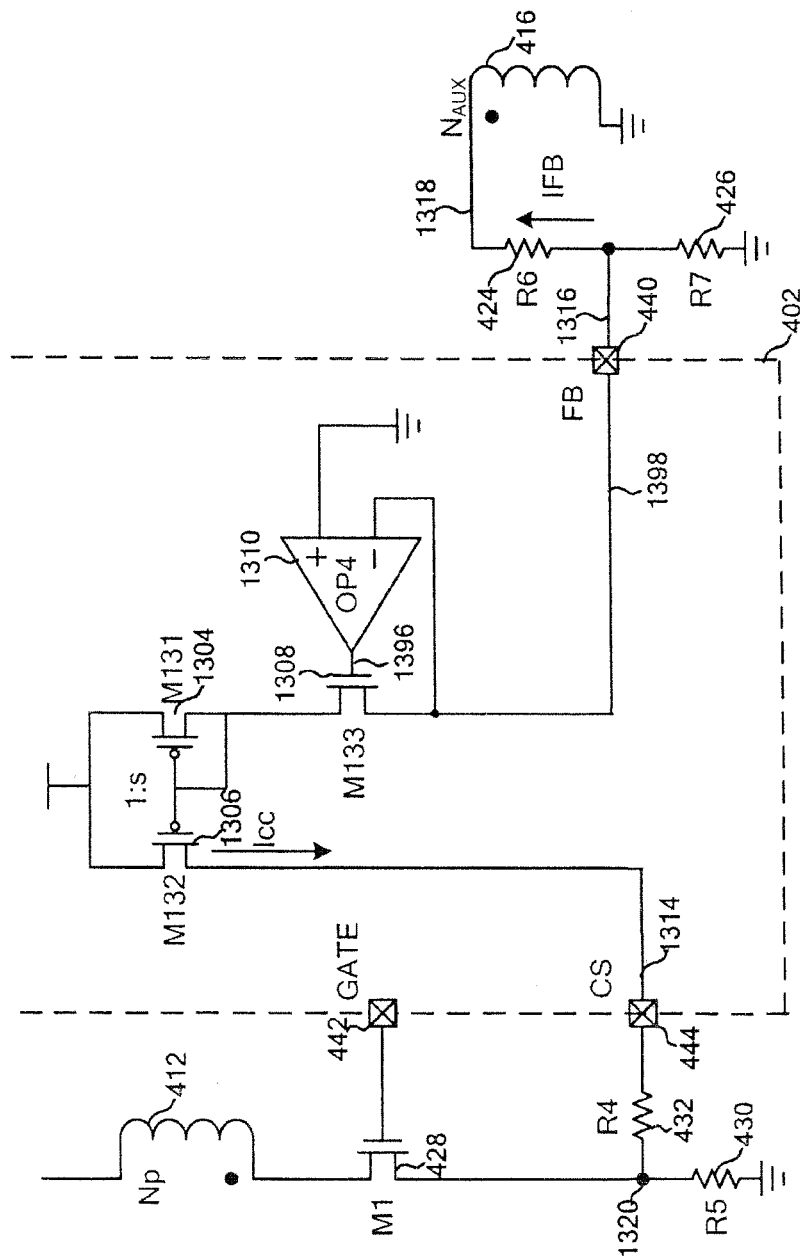
FIG. 13 is a simplified diagram showing certain components of the system as shown in FIG. 4 according to another embodiment of the present invention.
Figure 15:
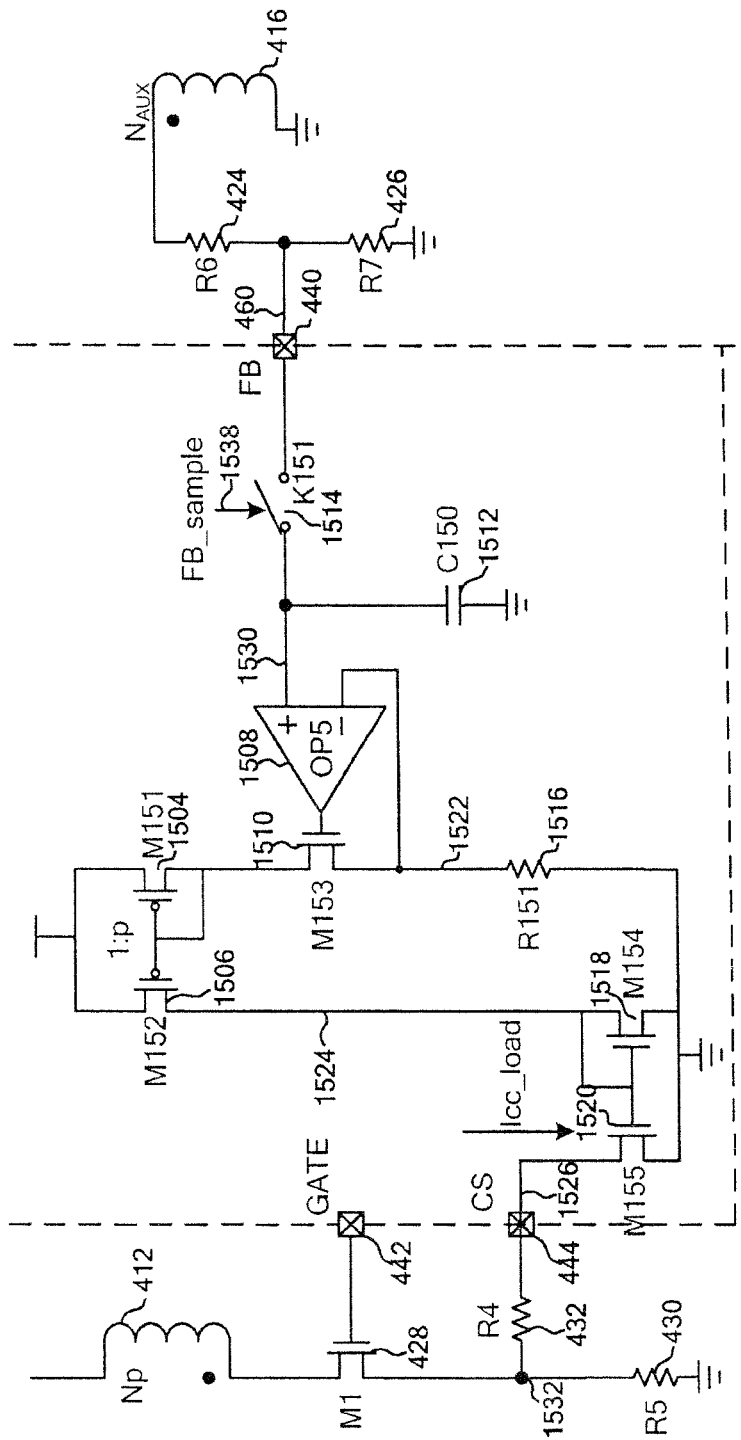
FIG. 15 is a simplified diagram showing certain components of the system as shown in FIG. 4 according to yet another embodiment of the present invention.

According to yet another embodiment, the controller 402 includes an error amplifier (e.g., as shown in FIGS. 5-8 and 11) which, compared with the error amplifier 216, has higher output impedance and a larger gain. For example, the controller 402 includes at least part of a line-voltage-compensation component (e.g., as shown in FIG. 13) for keeping the output current approximately constant (e.g., with a small error) under a wide range of input line voltages. In another example, the resistor 432 is included in the line-voltage-compensation component. In yet another example, the controller 402 includes at least part of a load-compensation component (e.g., as shown in FIG. 15) for keeping the output current approximately constant (e.g., with a small error) under a wide range of output voltages. In yet another example, the resistor 432 is included in the load-compensation component. In some embodiments, the resistor 432 is omitted.

Figure 5:
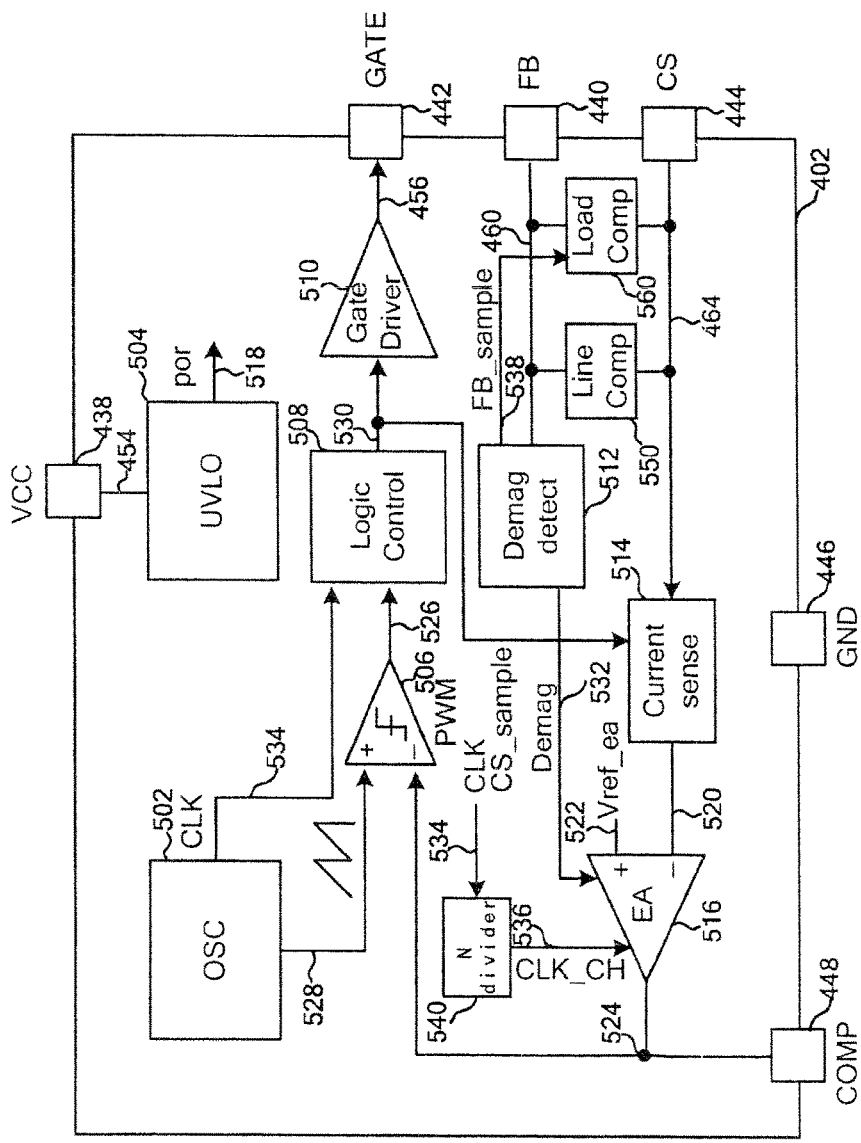
FIG. 5 is a simplified diagram showing the controller as part of the power conversion system as shown in FIG. 4 according to an embodiment of the present invention.

FIG. 5 is a simplified diagram showing the controller 402 as part of the power conversion system 400 according to an embodiment of the present invention. This diagram is merely an example, which should not unduly limit the scope of the claims. One of ordinary skill in the art would recognize many variations, alternatives, and modifications. The controller 402 includes an oscillator 502, an under-voltage lock-out (UVLO) component 504, a modulation component 506, a logic controller 508, a driving component 510, a demagnetization detector 512, an error amplifier 516, a current-sensing component 514, and a chopping component 540. In addition, the controller 402 includes at least part of a line-voltage-compensation component 550 and at least part of a load-compensation component 560.

According to one embodiment, the UVLO component 504 detects the signal 454 and outputs a signal 518. For example, if the signal 454 is larger than a predetermined threshold in magnitude, the controller 402 begins to operate normally. In another example, if the signal 454 is smaller than the predetermined threshold in magnitude, the controller 402 is turned off. In yet another example, the error amplifier 516 receives a signal 520 from the current-sensing component 514 and a reference signal 522 and outputs an amplified signal 524 to the modulation component 506. In yet another example, the modulation component 506 also receives a signal 528 from the oscillator 502 and outputs a modulation signal 526. In yet another example, the signal 528 is a ramping signal and increases, linearly or non-linearly, to a peak magnitude during each switching period. In yet another example, the modulation signal 526 is a pulse-width-modulation (PWM) signal with a fixed switching frequency and the duty cycle of the signal 526 is determined based on a comparison between the signal 524 and the signal 528. In yet another example, the logic controller 508 processes the modulation signal 526 and outputs a control signal 530 to the driving component 510 which generates the signal 456 to turn on or off the switch 428. In yet another example, the logic controller 508 also outputs the control signal 530 to the current sensing component 514.

According to another embodiment, the control signal 456 is at a logic high level if the control signal 530 is at a logic high level. For example, the control signal 456 is at a logic low level if the control signal 530 is at a logic low level. In another example, the demagnetization detector 512 detects the feedback signal 460 and outputs a demagnetization signal 532 for determining the beginning and the end of the demagnetization process of the secondary winding 414 during each switching period. In yet another example, the demagnetization signal 532 is at a logic high level during the demagnetization period of each switching cycle, and at a logic low level during the rest of each switching cycle. In yet another example, the demagnetization signal 532 changes from the logic low level to the logic high level if the control signal 456 changes from the logic high level to the logic low level. In yet another example, the demagnetization detector 512 outputs a sampling signal 538 to the load-compensation component 560.

According to yet another embodiment, the chopping component 540 receives a clock signal 534 from the oscillator 502 and outputs a signal 536 to the error amplifier 516. For example, the signal 536 is also a clock signal that has a 50% duty cycle and a frequency which is 1/N of the frequency of the clock signal 534. In another example, if the signal 536 is at a logic high level, the error amplifier 516 receives the reference signal 522 at a non-inverting input terminal and receives the signal 520 at an inverting input terminal; if the signal 536 is at a logic low level, the error amplifier 516 receives the reference signal 522 at the inverting input terminal and receives the signal 520 at the non-inverting input terminal. In response, the offset voltage of the error amplifier 516 generated during the time period when the signal 536 is at the logic high level, and the offset voltage of the error amplifier 516 generated during the time period when the signal 536 is at the logic low level are equal in magnitude but have different polarities, in certain embodiments. For example, if the signal 536 has a 50% duty cycle, the offset voltage generated during the time period when the signal 536 is at the logic high level cancels out the offset voltage generated during the time period when the signal 536 is at the logic low level. Thus, an average offset voltage during a complete chopping period of the signal 536 is approximately zero, according to some embodiments.

In another embodiment, the line-voltage-compensation component 550 is used for keeping the output current approximately constant (e.g., with a small error) under a wide range of input line voltages. For example, the load-compensation component 560 is used for keeping the output current approximately constant (e.g., with a small error) under a wide range of output voltages.

As discussed above and further emphasized here, FIG. 5 is merely an example, which should not unduly limit the scope of the claims. One of ordinary skill in the art would recognize many variations, alternatives, and modifications. For example, the current-sensing component 514 is the same as the current-sensing component 214. In another example, the error amplifier 516 can be replaced by the error amplifier 216. In some embodiments, the line-voltage-compensation component 550 is removed. In certain embodiments, the load-compensation component 560 is removed.

Figure 6:
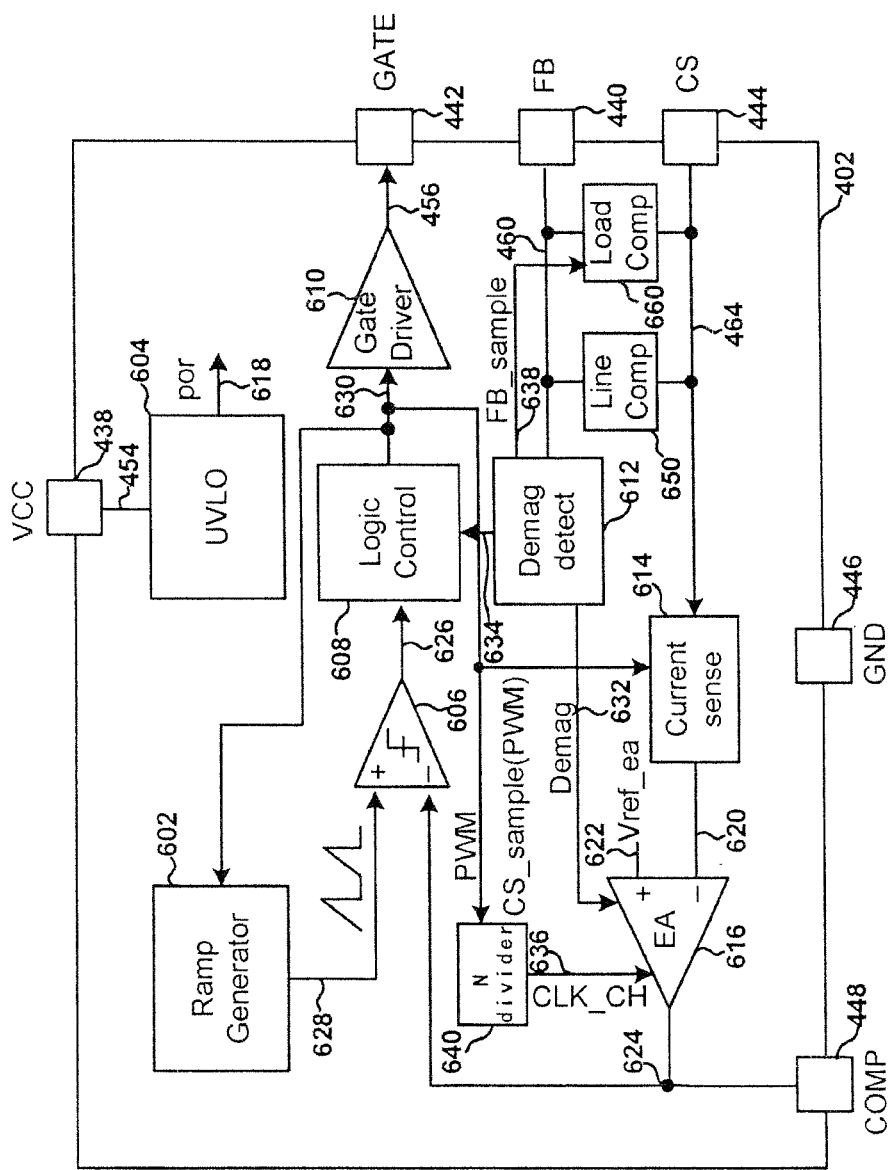
FIG. 6 is a simplified diagram showing the controller as part of the power conversion system as shown in FIG. 4 according to another embodiment of the present invention.

FIG. 6 is a simplified diagram showing the controller 402 as part of the power conversion system 400 according to another embodiment of the present invention. This diagram is merely an example, which should not unduly limit the scope of the claims. One of ordinary skill in the art would recognize many variations, alternatives, and modifications. The controller 402 includes a ramp-signal generator 602, an under-voltage lock-out (UVLO) component 604, a modulation component 606, a logic controller 608, a driving component 610, a demagnetization detector 612, an error amplifier 616, a current-sensing component 614, and a chopping component 640. In addition, the controller 402 includes at least part of a line-voltage-compensation component 650 and at least part of a load-compensation component 660.

According to one embodiment, the UVLO component 604 detects the signal 454 and outputs a signal 618. For example, if the signal 454 is larger than a predetermined threshold in magnitude, the controller 402 begins to operate normally. In another example, if the signal 454 is smaller than the predetermined threshold in magnitude, the controller 402 is turned off. In yet another example, the error amplifier 616 receives a signal 620 from the current-sensing component 614 and a reference signal 622 and outputs an amplified signal 624 to the modulation component 606. In yet another example, the modulation component 606 also receives a signal 628 from the ramp-signal generator 602 and outputs a modulation signal 626. In yet another example, the signal 628 is a ramping signal and increases, linearly or non-linearly, to a peak magnitude during each switching period. In yet another example, the modulation signal 626 does not have a fixed switching frequency. In yet another example, the logic controller 608 processes the modulation signal 626 and outputs a control signal 630 to the driving component 610 which generates the signal 456 to turn on or off the switch 428. In yet another example, the logic controller 608 also outputs the control signal 630 to the current sensing component 614.

According to another embodiment, the control signal 456 is at a logic high level if the control signal 630 is at a logic high level. For example, the control signal 456 is at a logic low level if the control signal 630 is at a logic low level. In yet another example, the demagnetization detector 612 detects the feedback signal 460 and outputs a demagnetization signal 632 for determining the beginning and the end of the demagnetization process of the secondary winding 414 during each switching period. In yet another example, the demagnetization signal 632 is at a logic high level during the demagnetization period of each switching cycle, and at a logic low level during the rest of each switching cycle. In yet another example, the demagnetization signal 632 changes from the logic low level to the logic high level if the control signal 456 changes from the logic high level to the logic low level. In yet another example, the demagnetization detector 612 outputs a sampling signal 638 to the load-compensation component 660. In yet another example, the ramp-signal generator 602 receives the control signal 630 and outputs the signal 628.

According to yet another embodiment, the chopping component 640 receives the control signal 630 from the logic controller 608 and outputs a signal 636 to the error amplifier 616. For example, the signal 636 is also a clock signal that has a 50% duty cycle and a frequency which is 1/N of the frequency of the control signal 630. In another example, the signal 636 is used for chopping the error amplifier 616. In yet another example, the line-voltage-compensation component 650 is used for keeping the precision of the constant output current within a wide range of input line voltages. In yet another example, the load-compensation component 660 is used for keeping the precision of the constant output current within a wide range of output voltages.

As discussed above and further emphasized here, FIG. 6 is merely an example, which should not unduly limit the scope of the claims. One of ordinary skill in the art would recognize many variations, alternatives, and modifications. For example, the current-sensing component 614 is the same as the current-sensing component 214. In another example, the error amplifier 616 can be replaced by the error amplifier 216. In some embodiments, the line-voltage-compensation component 650 is removed. In certain embodiments, the load-compensation component 660 is removed.

Figure 7:
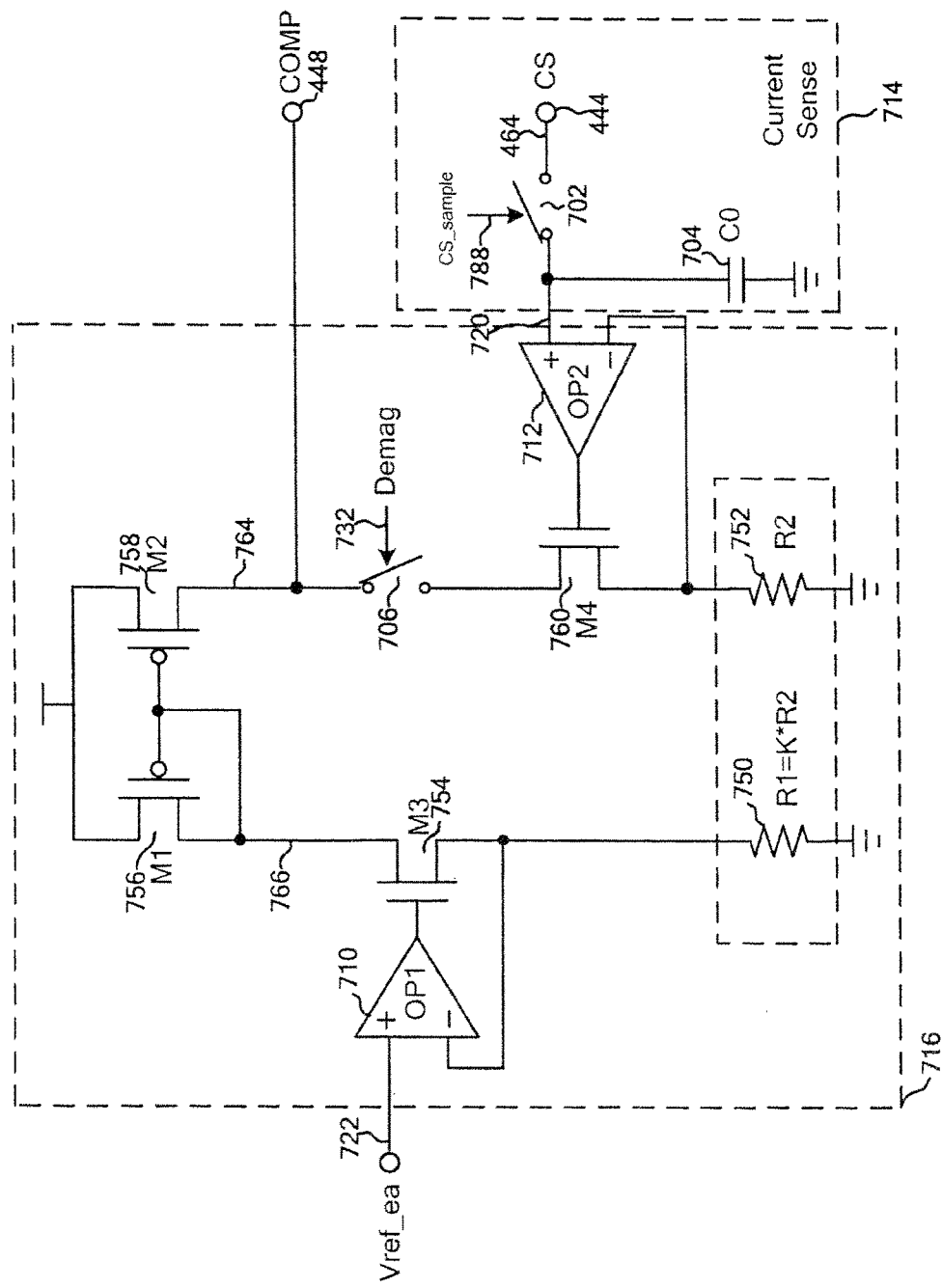
FIG. 7 is a simplified diagram showing certain components of the controller as part of the power conversion system as shown in FIG. 4 according to an embodiment of the present invention.

FIG. 7 is a simplified diagram showing certain components of the controller 402 as part of the power conversion system 400 according to an embodiment of the present invention. This diagram is merely an example, which should not unduly limit the scope of the claims. One of ordinary skill in the art would recognize many variations, alternatives, and modifications. The controller 402 includes a current-sensing component 714 and an error amplifier 716. The current-sensing component 714 includes a switch 702 and a capacitor 704. The error amplifier 716 includes operational amplifiers 710 and 712, a switch 706, transistors 754, 756, 758 and 760, and resistors 750 and 752. For example, the current-sensing component 714 is the same as the current-sensing component 514, and the error amplifier 716 is the same as the error amplifier 516, as shown in FIG. 5. In another example, the current-sensing component 714 is the same as the current-sensing component 614, and the error amplifier 716 is the same as the error amplifier 616, as shown in FIG. 6.

According to one embodiment, the current-sensing component 714 samples the current-sensing signal 464 and outputs a signal 720, and the error amplifier 716 amplifies the difference between a signal 720 and a reference signal 722. For example, the switch 702 is closed (e.g., being turned on) or open (e.g., being turned off) in response to a signal 788 in order to sample peak magnitudes of the current-sensing signal 464 in different switching periods. In another example, the switch 702 is closed if the signal 788 is at a logic high level, and the switch 702 is opened if the signal 788 is at a logic low level. In yet another example, if the switch 702 is closed (e.g., being turned on) in response to the signal 788, the capacitor 704 is charged and the signal 720 increases in magnitude. In yet another example, during the demagnetization process of the secondary winding 414, the signal 732 is at a logic high level, and the switch 706 is closed (e.g., being turned on). In yet another example, a current 764 flowing through the transistor 758 is proportional in magnitude to a current 766 flowing through the transistor 756.

According to another embodiment, the resistance of the resistor 750 is larger than the resistance of the resistor 752. For example, the resistance of the resistor 750 is equal to the resistance of the resistor 752 multiplied by a constant K (e.g., K>1). In another example, an average output current of the system 400 can be determined according to the following equation, without taking into account any error current:

$$\overline{I_o} = \frac{1}{2} \times N \times \frac{V_{ref\_ea}}{K \times R_{cs}}$$ (Equation 2)

where N represents a turns ratio between the primary winding 412 and the secondary winding 414, $V_{ref\_ea}$ represents the reference signal 722, and $K_{cs}$ represents the resistance of the resistor 430. For example, without affecting the efficiency of the system 400 or changing the resistance of the resistor 430, the reference signal 722 can be increased in magnitude by increasing the resistance of the resistor 750, so that the negative effects caused by the offset voltage of the amplifier 710 may be reduced significantly. In another example, the signal 788, the signal 720, the signal 722, the signal 730, and the signal 732 are the same as the signal 530, the signal 520, the signal 522, the signal 530, and the signal 532, respectively. In yet another example, the signal 788, the signal 720, the signal 722, the signal 730, and the signal 732 are the same as the signal 630, the signal 620, the signal 622, the signal 630, and the signal 632, respectively.

Figure 8:
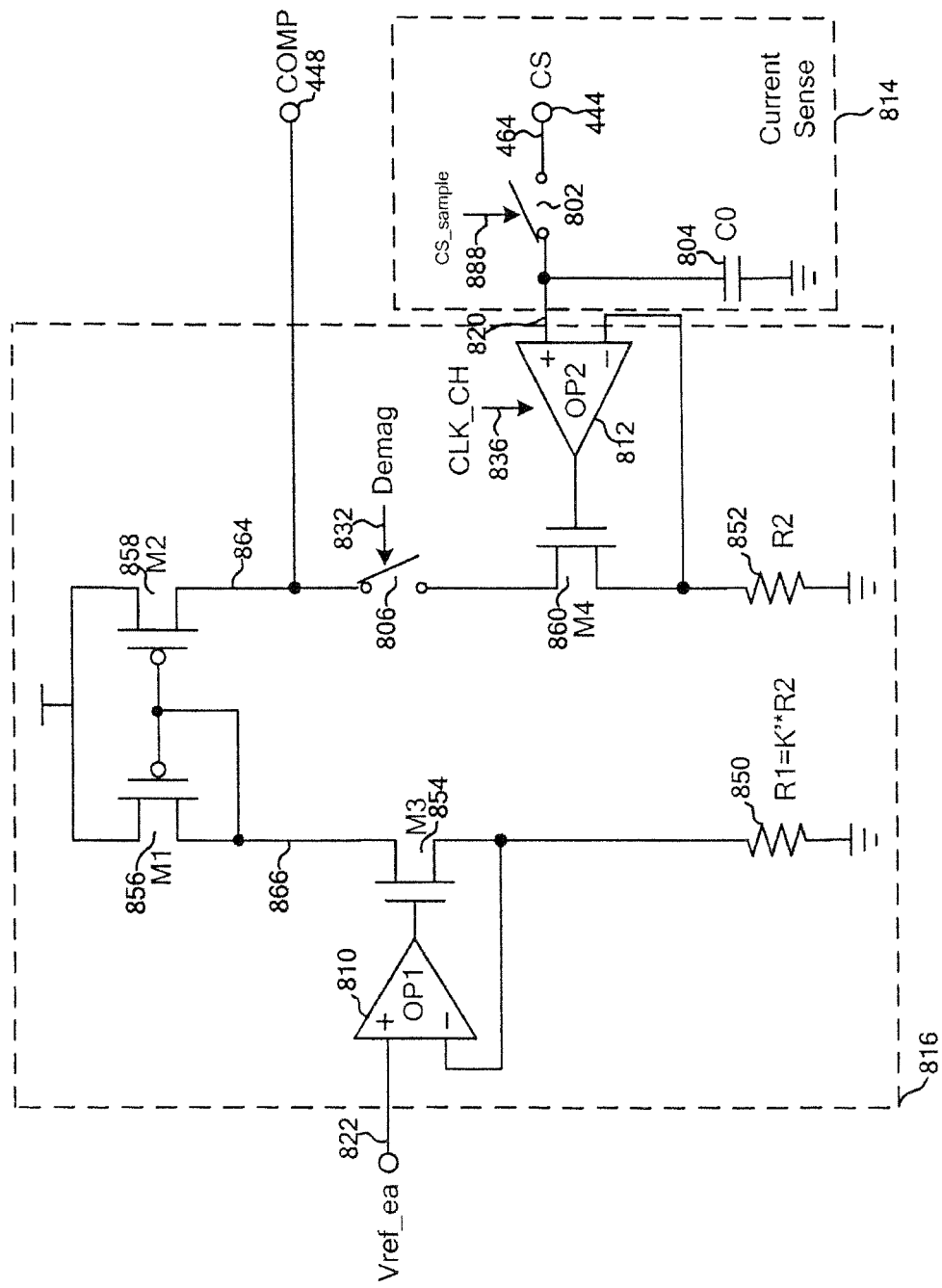
FIG. 8 is a simplified diagram showing certain components of the controller as part of the power conversion system as shown in FIG. 4 according to another embodiment of the present invention.

FIG. 8 is a simplified diagram showing certain components of the controller 402 as part of the power conversion system 400 according to another embodiment of the present invention. This diagram is merely an example, which should not unduly limit the scope of the claims. One of ordinary skill in the art would recognize many variations, alternatives, and modifications. The controller 402 includes a current-sensing component 814 and an error amplifier 816. The current-sensing component 814 includes a switch 802 and a capacitor 804. The error amplifier 816 includes operational amplifiers 810 and 812, a switch 806, transistors 854, 856, 858 and 860, and resistors 850 and 852. For example, the current-sensing component 814 is the same as the current-sensing component 514, and the error amplifier 816 is the same as the error amplifier 516, as shown in FIG. 5. In another example, the current-sensing component 814 is the same as the current-sensing component 614, and the error amplifier 816 is the same as the error amplifier 616, as shown in FIG. 6.

According to one embodiment, the current-sensing component 814 samples the current-sensing signal 464 and outputs a signal 820, and the error amplifier 816 amplifies the difference between a signal 820 and a reference signal 822. For example, the switch 802 is closed (e.g., being turned on) or open (e.g., being turned off) in response to a signal 888 in order to sample peak magnitudes of the current-sensing signal 464 in different switching periods. In another example, the switch 802 is closed if the signal 888 is at a logic high level, and the switch 802 is opened if the signal 888 is at a logic low level. In yet another example, if the switch 802 is closed (e.g., being turned on) in response to the signal 888, the capacitor 804 is charged and the signal 820 increases in magnitude. In yet another example, during the demagnetization process of the secondary winding 414, the signal 832 is at a logic high level, and the switch 806 is closed (e.g., being turned on). In yet another example, a current 864 flowing through the transistor 858 is proportional in magnitude to a current 866 flowing through the transistor 856.

According another embodiment, the resistance of the resistor 850 is larger than the resistance of the resistor 852. For example, the resistance of the resistor 850 is equal to the resistance of the resistor 852 multiplied by a constant K' (e.g., K'>1). In another example, an average output current of the system 400 can be determined according to the following equation, without taking into account any error current:

$$\overline{I_o} = \frac{1}{2} \times N \times \frac{V_{ref\_ea}}{K' \times R_{cs}}$$ (Equation 3)

where N represents a turns ratio between the primary winding 412 and the secondary winding 414, $V_{ref\_ea}$ represents the reference signal 822, and $R_{cs}$ represents the resistance of the resistor 430. For example, without affecting the efficiency of the system 400 or changing the resistance of the resistor 430, the reference signal 822 can be increased in magnitude by increasing the resistance of the resistor 850, so that the negative effects caused by the offset of the amplifier 810 may be reduced significantly. For example, the signal 888, the signal 820, the signal 822, the signal 830, and the signal 832 are the same as the signal 530, the signal 520, the signal 522, the signal 530, and the signal 532, respectively. In yet another example, the signal 888, the signal 820, the signal 822, the signal 830, and the signal 832 are the same as the signal 630, the signal 620, the signal 622, the signal 630, and the signal 632, respectively.

According yet another embodiment, the amplifier 812 receives a signal 836 from a chopping component (e.g., the component 540, or the component 640). For example, the status of the amplifier 812 changes in a switching period in response to the signal 836 so that the negative effects of the offset voltage of the amplifier 812 can be reduced. In another example, the signal 836 is a logic signal with a 50% duty cycle, and is either at a logic high level (e.g., "1") or at a logic low level (e.g., "0"). In another example, if the signal 836 is at a particular logic level (e.g., "1"), the operational amplifier 812 has a corresponding status, and if the signal 836 is at another logic level (e.g., "0"), the operational amplifier 812 assumes a different status, as shown in FIG. 9 and FIG. 10.

Figure 9:
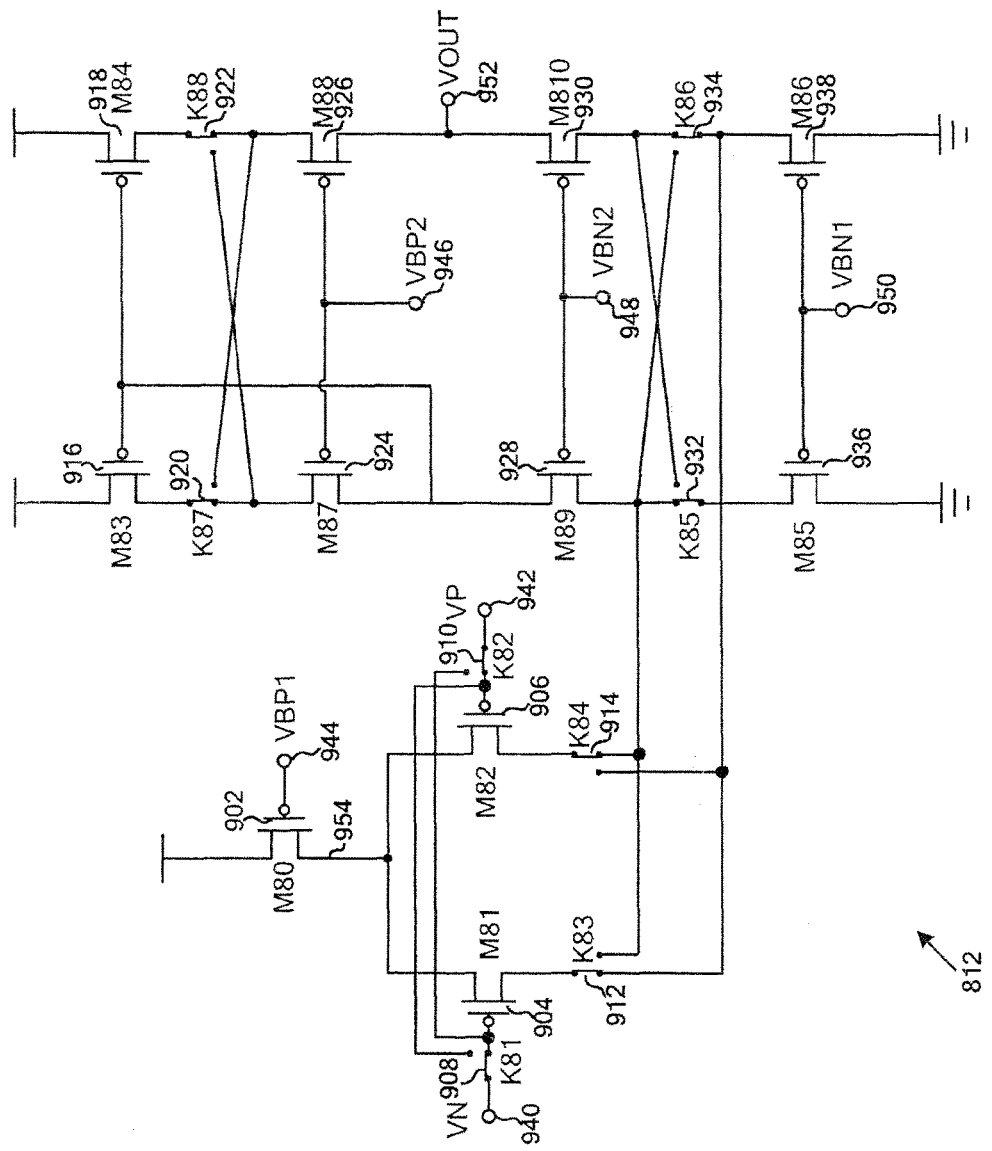
FIG. 9 and FIG. 10 are simplified diagrams showing different operation conditions of the operational amplifier as part of the error amplifier as shown in FIG. 8 according to certain embodiments of the present invention.
Figure 10:
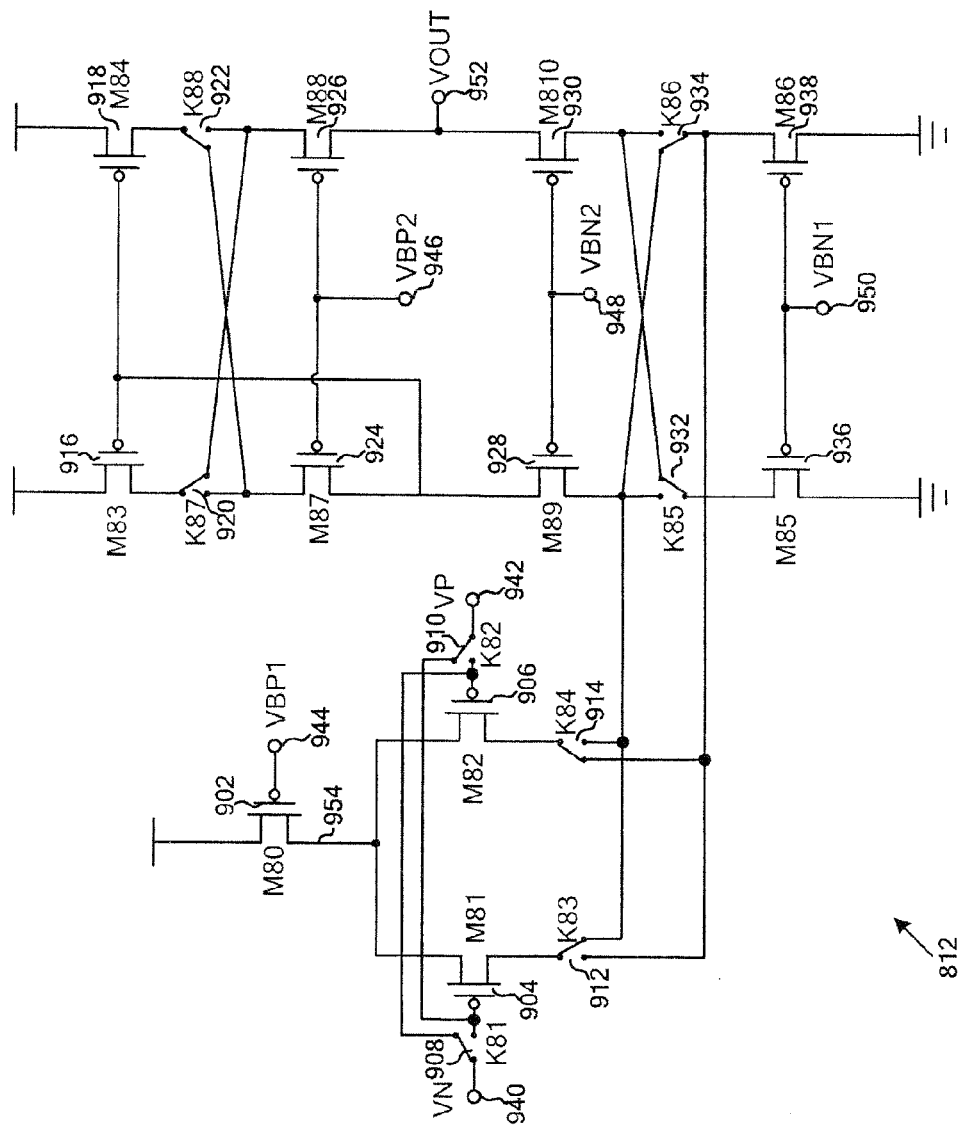

FIG. 9 and FIG. 10 are simplified diagrams showing different operation conditions of the operational amplifier 812 as part of the error amplifier 816 according to certain embodiments of the present invention. These diagrams are merely examples, which should not unduly limit the scope of the claims. One of ordinary skill in the art would recognize many variations, alternatives, and modifications. The amplifier 812 includes transistors 902, 904, 906, 916, 918, 924, 926, 928, 930, 936 and 938, and switches 908, 910, 912, 914, 920, 922, 932 and 934. In addition, the amplifier 812 includes an inverting input terminal 940, a non-inverting input terminal 942 and an output terminal 952. For example, each of the switches 908, 910, 912, 914, 920, 922, 932 and 934 can toggle between two states.

As shown in FIG. 9, in response to the signal 836 being at a particular logic level (e.g., "1"), the operational amplifier 812 assumes a certain status, according to one embodiment. For example, a gate terminal of the transistor 904 is connected to the inverting input terminal 940, and a gate terminal of the transistor 906 is connected to the non-inverting input terminal 942, in response to the states of the switches 908, 910, 912 and 914. In another example, the transistor 918 and the transistor 938 are in a same current path including the transistors 926 and 930 and the output terminal 952, in response to the states of the switches 920, 922, 932 and 934.

As shown in FIG. 10, in response to the signal 836 being at a different logic level (e.g., "0"), the operational amplifier 812 assumes a different status, according to another embodiment. For example, a gate terminal of the transistor 906 is connected to the inverting input terminal 940, and a gate terminal of the transistor 904 is connected to the non-inverting input terminal 942, in response to the states of the switches 908, 910, 912 and 914. In another example, the transistor 916 and the transistor 936 are in a same current path including the transistors 926 and 930 and the output terminal 952, in response to the states of the switches 920, 922, 932 and 934. As shown in FIG. 9 and FIG. 10, the transistor 902 provides a bias current 954 for the input terminals 940 and 942, according to certain embodiments. For example, signals 944, 946, 948 and 950 are bias voltage signals.

As discussed above and further emphasized here, FIGS. 7 and 8 are merely examples, which should not unduly limit the scope of the claims. One of ordinary skill in the art would recognize many variations, alternatives, and modifications. For example, additional components/devices may be included in the error amplifier 716 or the error amplifier 816 to yield large output impedance, to increase gain and/or to reduce the mismatch between the transistors 756 and 758 or the mismatch between the transistors 856 and 858, respectively, as shown in FIG. 11.

Figure 11:
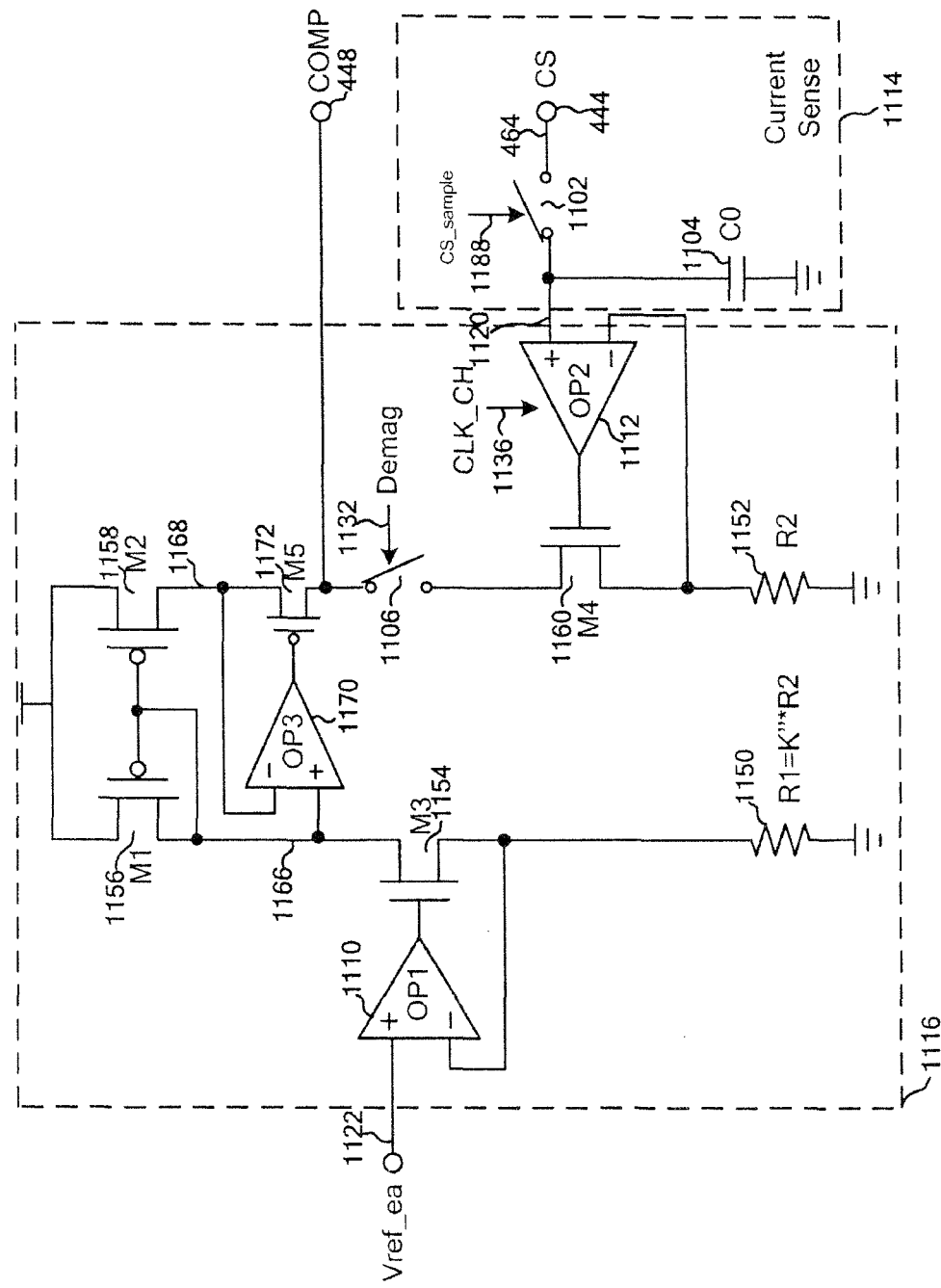
FIG. 11 is a simplified diagram showing certain components of the controller as part of the power conversion system as shown in FIG. 4 according to yet another embodiment of the present invention.

FIG. 11 is a simplified diagram showing certain components of the controller 402 as part of the power conversion system 400 according to yet another embodiment of the present invention. This diagram is merely an example, which should not unduly limit the scope of the claims. One of ordinary skill in the art would recognize many variations, alternatives, and modifications. The controller 402 includes a current-sensing component 1114 and an error amplifier 1116. The current-sensing component 1114 includes a switch 1102 and a capacitor 1104. The error amplifier 1116 includes operational amplifiers 1110, 1112 and 1170, a switch 1106, transistors 1154, 1156, 1158, 1160 and 1172, and resistors 1150 and 1152. For example, the current-sensing component 1114 is the same as the current-sensing component 514, and the error amplifier 1116 is the same as the error amplifier 516. In another example, the current-sensing component 1114 is the same as the current-sensing component 614, and the error amplifier 1116 is the same as the error amplifier 616.

According to one embodiment, the current-sensing component 1114 samples the current-sensing signal 464 and outputs a signal 1120, and the error amplifier 1116 amplifies the difference between a signal 1120 and a reference signal 1122. For example, the switch 1102 is closed (e.g., being turned on) or open (e.g., being turned off) in response to a signal 1188 in order to sample peak magnitudes of the current-sensing signal 464 in different switching periods. In another example, the switch 1102 is closed if the signal 1188 is at a logic high level, and the switch 1102 is opened if the signal 1188 is at a logic low level. In yet another example, if the switch 1102 is closed (e.g., being turned on) in response to the signal 1188, the capacitor 1104 is charged and the signal 1120 increases in magnitude. In yet another example, during the demagnetization process of the secondary winding 414, the signal 1132 is at a logic high level, and the switch 1106 is closed (e.g., being turned on). In yet another example, the amplifier 1170 and the transistor 1172 form a gain boost circuit. In yet another example, the gain boost circuit including the amplifier 1170 and the transistor 1172 increases the output impedance of the error amplifier 1116, and makes a voltage 1166 at a drain terminal of the transistor 1156 approximately equal to a voltage 1168 at a drain terminal of the transistor 1158 in order to reduce the mismatch between the transistor 1156 and 1158.

According to another embodiment, the resistance of the resistor 1150 is larger than the resistance of the resistor 1152. For example, the resistance of the resistor 1150 is equal to the resistance of the resistor 1152 multiplied by a constant K" (e.g., K">1). In another example, an average output current of the system 400 can be determined according to the following equation, without taking into account any error current:

$$\overline{I_o} = \frac{1}{2} \times N \times \frac{V_{ref\_ea}}{K'' \times R_{cs}} \quad \text{(Equation 4)}$$

where N represents a turns ratio between the primary winding 412 and the secondary winding 414, $V_{ref\_ea}$ represents the reference signal 1122, and $R_{cs}$ represents the resistance of the resistor 430. For example, without affecting the efficiency of the system 400 or changing the resistance of the resistor 430, the reference signal 1122 can be increased in magnitude by increasing the resistance of the resistor 1150, so that the negative effects caused by the offset of the amplifier 1110 may be reduced significantly. For example, the signal 1188, the signal 1120, the signal 1122, the signal 1130, and the signal 1132 are the same as the signal 530, the signal 520, the signal 522, the signal 530, and the signal 532, respectively. In yet another example, the signal 1188, the signal 1120, the signal 1122, the signal 1130, and the signal 1132 are the same as the signal 630, the signal 620, the signal 622, the signal 630, and the signal 632, respectively.

According yet another embodiment, the amplifier 1112 receives a signal 1136 from a chopping component (e.g., the component 540, or the component 640). For example, the status of the amplifier 1112 changes in a switching period in response to the signal 1136 so that the negative effects of the offset voltage of the amplifier 1112 can be reduced. In another example, the signal 1136 is a logic signal with a 50% duty cycle, and is either at a logic high level (e.g., "1") or at a logic low level (e.g., "0"). In another example, if the signal 1136 is at a particular logic level (e.g., "1"), the operational amplifier 1112 has a corresponding status, and if the signal 1136 is at another logic level (e.g., "0"), the operational amplifier 1112 assumes a different status, similar to what are shown in FIG. 9 and FIG. 10.

Figure 1:
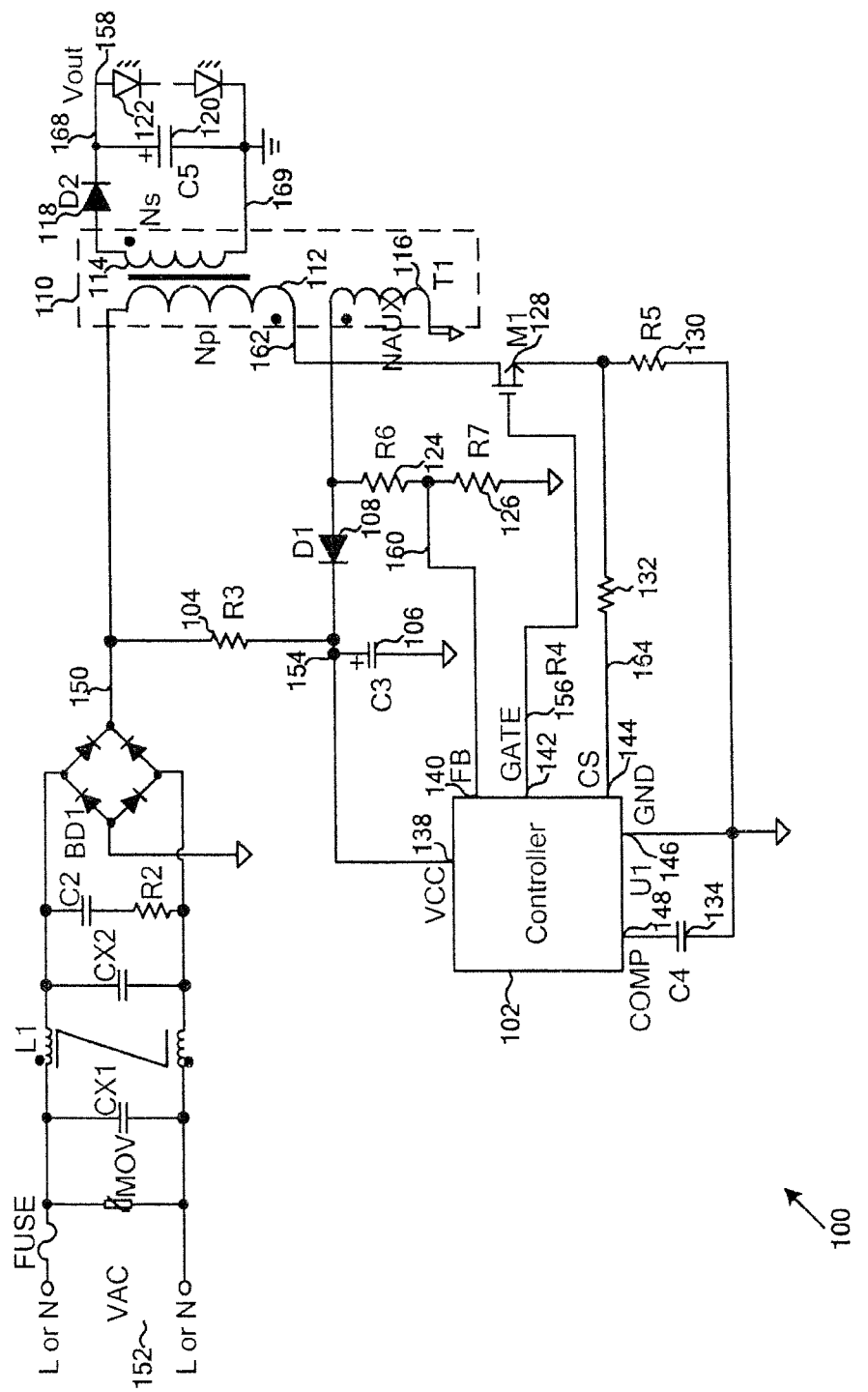
FIG. 1 is a simplified diagram showing a conventional power conversation system for LED lighting.
Figure 2:
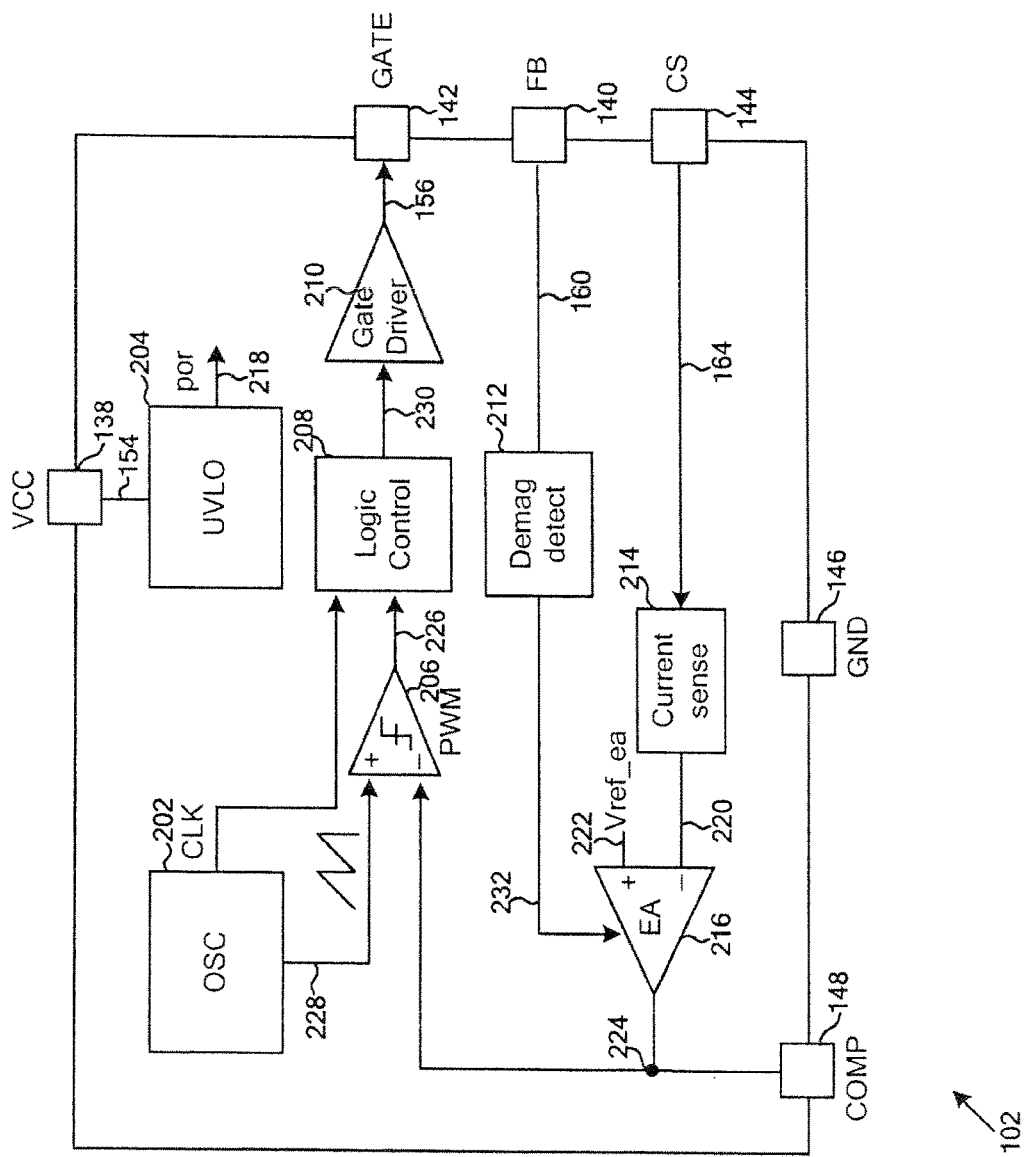
FIG. 2 is a simplified conventional diagram showing the controller as part of the system as shown in FIG. 1.
Figure 3:
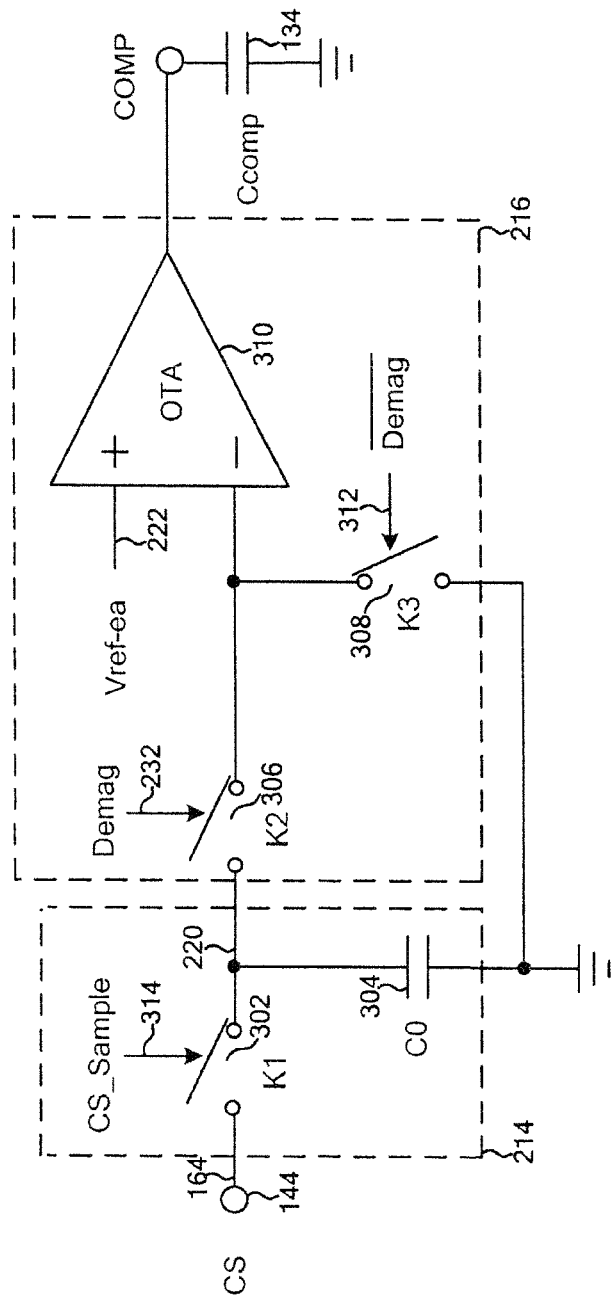
FIG. 3 is a simplified conventional diagram showing the current-sensing component and the error amplifier as parts of the controller as shown in FIG. 2.

Referring back to FIG. 1 and FIG. 2, the input line voltage 152 often varies in a range 90 V~264 V in actual applications. Due to non-ideal factors, such as transmission delay, the actual output current 158 is different from the designed ideal current value, e.g., by an amount $\Delta I_{out}$.

Figure 12:
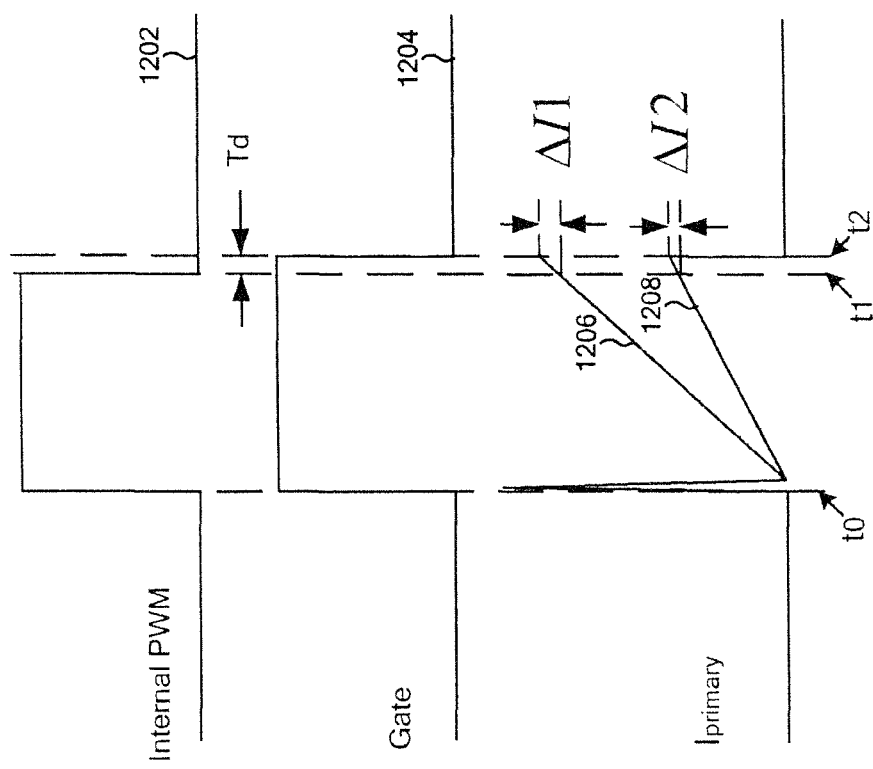
FIG. 12 is a simplified timing diagram for the system as shown in FIG. 1 showing the difference between the actual peak magnitude of the primary current and the desired peak magnitude as a function of the input line voltage.

FIG. 12 is a simplified timing diagram for the system 100 showing the difference between the actual peak magnitude of the primary current 162 and the desired peak magnitude as a function of the input line voltage 152. The waveform 1202 represents the signal 226 as a function of time, the waveform 1204 represents the signal 156 as a function of time, the waveform 1206 represents the primary current 162 under a high input line voltage as a function of time, and the waveform 1208 represents the primary current 162 under a low input line voltage as a function of time.

As shown in FIG. 12, during a switching period, the modulation component 206 changes, at $t_0$, the signal 226 from a logic low level to a logic high level (e.g., as shown by the waveform 1202), and the driving component 210 changes the signal 156 from the logic low level to the logic high level (e.g., as shown by the waveform 1204). Then, at $t_1$, the modulation component 206 changes the signal 226 from the logic high level to the logic low level (e.g., as shown by the waveform 1202). After a transmission delay (e.g., $T_d$), the driving component 210 changes the signal 156 from the logic high level to the logic low level (e.g., at $t_2$ as shown by the waveform 1204). Between $t_0$ and $t_2$, the primary current 162 increases in magnitude, e.g., as shown by the waveforms 1206 and 1208. The primary current associated with the high line input voltage increases faster than that associated with the low line input voltage, e.g., as shown by the waveforms 1206 and 1208. The increase of the primary current 162 between $t_1$ and $t_2$ can be determined according to the following equation:

$$\Delta I = \frac{V_{AC}}{L} \times T_d \quad \text{(Equation 5)}$$

where $V_{AC}$ represents the input line voltage 152, L represents the inductance of the primary winding 112, and $T_d$ represents the transmission delay. The increase of the current-sensing signal 164 between $t_1$ and $t_2$ corresponding to the increase of the primary current 162 is determined according to the following equation:

$$\Delta V_{CS} = R5 \times \frac{V_{AC}}{L} \times T_d \quad \text{(Equation 6)}$$

where R5 represents the resistance of the current sensing resistor 130.

According to Equation 5, with the same transmission delay, the change of the primary current 162 between $t_1$ and $t_2$ associated with the high line input voltage is larger in magnitude than that associated with the low line input voltage. Thus, the residual amount of the output current changes with the line input voltage.

FIG. 13 is a simplified diagram showing certain components of the system 400 according to another embodiment of the present invention. This diagram is merely an example, which should not unduly limit the scope of the claims. One of ordinary skill in the art would recognize many variations, alternatives, and modifications. The controller 402 further includes transistors 1304, 1306 and 1308, and an operational amplifier 1310. For example, the line-voltage-compensation component 550 includes the resistors 424, 430 and 432, the transistors 1304, 1306 and 1308, and the operational amplifier 1310. In another example, the line-voltage-compensation component 650 includes the resistors 424, 430 and 432, the transistors 1304, 1306 and 1308, and the operational amplifier 1310.

According to one embodiment, a non-inverting input terminal (e.g., the "+" terminal as shown in FIG. 13) of the amplifier 1310 is connected to a ground voltage, and an inverting input terminal (e.g., the "−" terminal as shown in FIG. 13) of the amplifier 1310 is connected to the terminal 440 (e.g., terminal FB). For example, before and/or after the demagnetization process, if the switch 428 is closed (e.g., being turned on), a voltage 1318 at the auxiliary winding 416 is lower than the ground voltage (e.g., 0 V). In another example, the operational amplifier 1310 operates with the transistor 1308 to adjust a voltage 1398 at the terminal 440 (e.g., FB) to be approximately equal to the ground voltage (e.g., 0 V). In yet another example, a current 1316 flows out of the controller 402 via the terminal 440 (e.g., FB) through the resistor 424. In another example, the current 1316 is determined according to the following equation:

$$I_{FB} = \frac{V_{AC}}{R6} \times N_{ap} \quad \text{(Equation 7)}$$

where $I_{FB}$ represents the current 1316, $V_{AC}$ represents the line input voltage 452, $N_{ap}$ represents the turns ratio between the auxiliary winding 416 and the primary winding 412, and R6 represents the resistance of the resistor 424. In yet another example, during the demagnetization process, if the voltage 1318 at the auxiliary winding 416 is higher than the ground voltage, a voltage 1398 at the terminal 440 (e.g., FB) is higher than the ground voltage, and in response the operational amplifier 1310 outputs a signal 1396 to turn off the transistor 1308.

According to another embodiment, the size (e.g., the ratio between the width and the length) of the transistor 1304 is proportional to that of the transistor 1306. For example, a current mirror circuit including the transistors 1304 and 1306 mirrors the current 1316 to generate a current 1314. In another example, the current 1314 flows from the transistor 1306 to the resistor 432 through the terminal 444 (e.g., terminal CS). In yet another example, the current 1314 before and/or after the demagnetization process is determined according to the following equation:

$$I_{CC\_AC} = \frac{V_{AC}}{R6} \times N_{ap} \times \frac{1}{s} \quad \text{(Equation 8)}$$

where $I_{CC\_AC}$ represents the current 1314, and s represents the ratio between the size of the transistor 1304 and that of the transistor 1306. In another example, a compensation value for a current-sensing signal 1320 before and/or after the demagnetization process is determined according to the following equation:

$$\Delta CS = \frac{R4 \times V_{AC}}{R6} \times N_{ap} \times \frac{1}{s} \quad \text{(Equation 9)}$$

where ΔCS represents the compensation value for the current-sensing signal 1320 and R4 represents the resistance of the resistor 432. For example, the voltage at the terminal 444 is equal to the current-sensing signal 1320 raised by ΔCS in magnitude. In another example, the current-sensing signal 1320 is proportional to the primary current 462 in magnitude.

In one embodiment, if certain error output current is taken into account but no compensation for the current-sensing signal 1320 (e.g., ΔCS as shown in Equation 9) is taken into account, an average output current of the system 400 is determined according to the following equation:

$$\overline{I_o} = \frac{1}{2} \times N \times \frac{V_{ref\_ea}}{R_{cs}} + \Delta I_o(V_{AC}) \quad \text{(Equation 10)}$$

where N represents a turns ratio between the primary winding 412 and the secondary winding 414, $V_{ref\_ea}$ represents an internal reference signal (e.g., the reference signal 522, or the reference signal 622), $R_{cs}$ represents the resistance of the resistor 430, and $\Delta I_o(V_{AC})$ represents an error output current as a function of the line input voltage 452 (e.g., $V_{AC}$).

In another embodiment, if a compensation for the current-sensing signal 1320 (e.g., ΔCS as shown in Equation 9) is also taken into account, the internal reference signal (e.g., the reference signal 522, or the reference signal 622) is effectively reduced by the same amount of compensation. For example, based on Equation 10, the following is obtained:

$$\overline{I_o} = \frac{1}{2} \times N \times \frac{V_{ref\_ea} - \Delta CS}{R_{cs}} + \Delta I_o(V_{AC}) \quad \text{(Equation 11)}$$

Thus, under different input line voltages, the average output current of the system 400 can be kept approximately constant by adjusting the compensation value ΔCS for the current-sensing signal 1320 (e.g., by adjusting the resistances of the resistors 432 and 424) according to certain embodiments.

Referring back to FIG. 1 and FIG. 2, oftentimes, because of the leakage inductance of the transformer 110, the energy in the primary side cannot be fully transferred to the secondary side, and thus the output current 158 is different from the designed ideal current value, e.g., by an amount $\Delta I_{out}$. Such difference changes with the output voltage 168.

Figure 14:
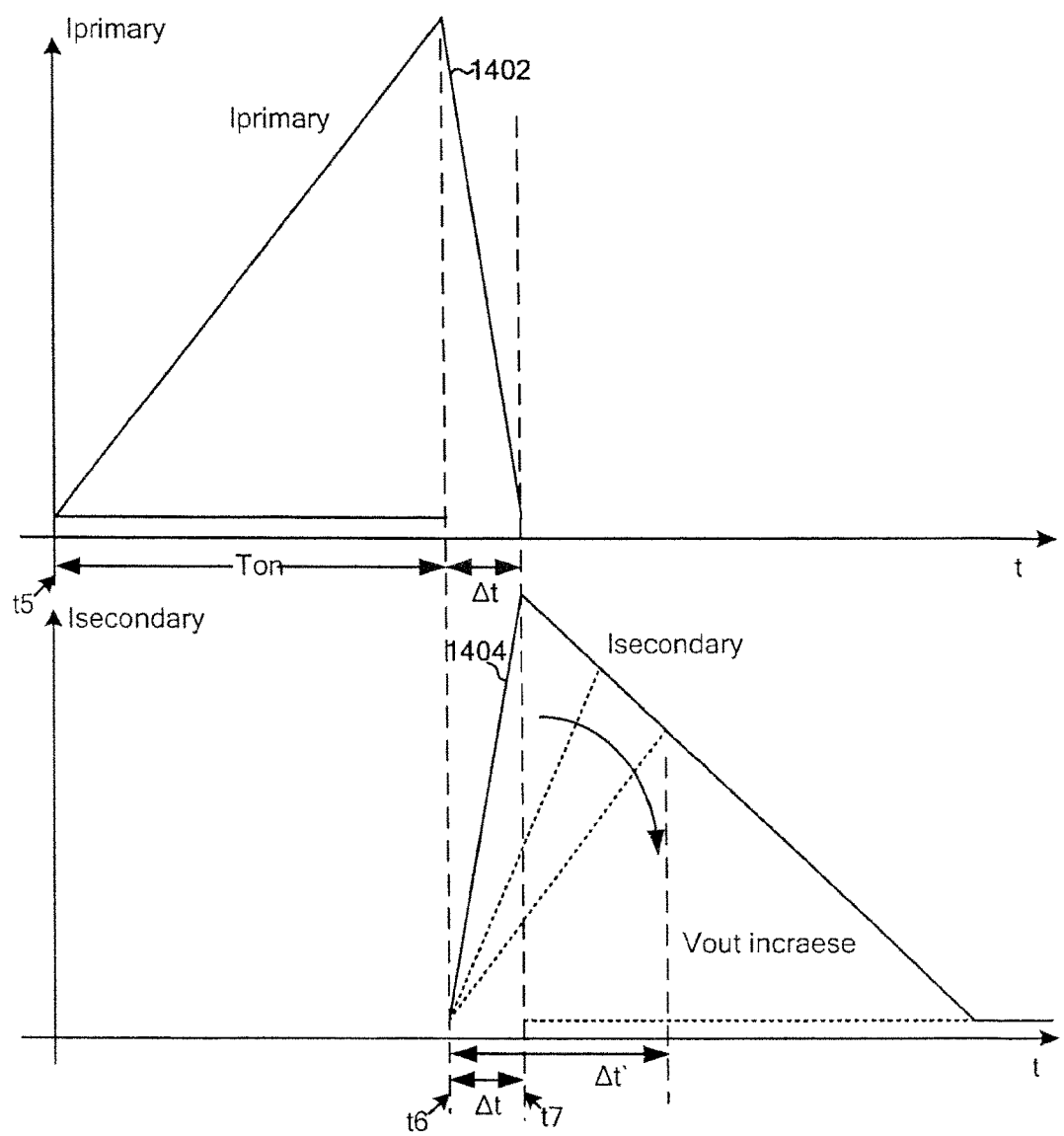
FIG. 14 is a simplified timing diagram for the system as shown in FIG. 1 showing the peak magnitude of the secondary current as a function of the output voltage.

FIG. 14 is a simplified timing diagram for the system 100 showing the peak magnitude of the secondary current 169 as a function of the output voltage 168. The waveform 1402 represents the primary current 162 as a function of time, and the waveform 1404 represents the secondary current 169 as a function of time. For example, the secondary current 169 is closely related to the output current 158.

As shown in FIG. 14, during an on-time period (e.g., between $t_5$ and $t_6$), the switch 128 is closed (e.g., being turned on), and the primary current 162 increases in magnitude, e.g., as shown by the waveform 1402. At $t_6$, the switch 128 is open (e.g., being turned off). During a time period Δt (e.g., between $t_6$ and $t_7$), the primary current 162 decreases in magnitude due to the leakage inductance (e.g., as shown by the waveform 1402), and the secondary current 169 increases in magnitude from a low magnitude (e.g., $t_6$) to a peak magnitude (e.g., at $t_7$) as shown by the waveform 1404. After $t_7$, the secondary current 169 decreases in magnitude, e.g., as shown by the waveform 1404. If the output voltage 168 increases in magnitude, the duration of the time period Δt (e.g., between $t_6$ and $t_7$) increases and the peak magnitude of the secondary current 169 decreases (e.g., as shown by the waveform 1404). Thus, the output current 158 decreases in magnitude, and the difference between the output current 158 and the ideal current value increases.

FIG. 15 is a simplified diagram showing certain components of the system 400 according to yet another embodiment of the present invention. This diagram is merely an example, which should not unduly limit the scope of the claims. One of ordinary skill in the art would recognize many variations, alternatives, and modifications. The controller 402 further includes transistors 1504, 1506, 1510, 1518 and 1520, an operational amplifier 1508, a resistor 1516, a capacitor 1512, and a switch 1514. For example, the load-compensation component 560 includes the resistor 432, the transistors 1504, 1506, 1510, 1518 and 1520, the operational amplifier 1508, the resistor 1516, the capacitor 1512, and the switch 1514. In another example, the load-compensation component 660 includes the resistor 432, the transistors 1504, 1506, 1510, 1518 and 1520, the operational amplifier 1508, the resistor 1516, the capacitor 1512, and the switch 1514.

According to one embodiment, if the switch 1514 is closed (e.g., being turned on) in response to a sampling signal 1538 during the demagnetization process of the secondary winding 414, the feedback signal 460 is sampled and held at the capacitor 1512. For example, the amplifier 1508 receives the sampled-and-held signal 1530 at a non-inverting input terminal (e.g., the "+" terminal as shown in FIG. 15). In another example, the sampled-and-held signal 1530 is determined according to the following equation:

$$V_{FB\_sample} = V_{out} \times N_{as} \quad \text{(Equation 13)}$$

where $V_{FB\_sample}$ represents the sampled-and-held signal 1530, $V_{out}$ represents the output voltage 468, and $N_{as}$ represents the turns ratio between the auxiliary winding 416 and the secondary winding 414. In yet another example, before and/or after the demagnetization process of the secondary winding 414, the switch 1514 is opened (e.g., being turned off) in response to the sampling signal 1538. In yet another example, the sampling signal 1538 is the same as the signal 538. In yet another example, the sampling signal 1538 is the same as the signal 638.

According to another embodiment, if the switch 428 is closed (e.g., being turned on) during an on-time period, a current 1522 flows through the transistors 1504 and 1510 and the resistor 1516. For example, a current-mirror circuit including the transistors 1504, 1506, 1518 and 1520 mirrors the current 1522 to generate a current 1524 that flows through the transistors 1506 and 1518, and mirrors the current 1524 to generate a compensation current 1526 (e.g., $I_{CC\_load}$). In another example, the compensation current 1526 flows from the resistor 432 to the transistor 1520 through the terminal 444. In yet another example, during the demagnetization process, the compensation current 1526 is determined according to the following equation:

$$I_{CC\_load} = \frac{V_{FB\_sample}}{R151} \times \frac{1}{p} \qquad \text{(Equation 14)}$$

where $I_{CC\_load}$ represents the current 1526, $V_{FB\_sample}$ represents the sampled-and-held signal 1530, R151 represents the resistance of the resistor 1516, and p represents a ratio associated with the current mirror circuit including the transistors 1504, 1506, 1518 and 1520. In yet another example, the current 1526 flows through the resistor 432 to provide a compensation value for a current-sensing signal 1532 which, during the demagnetization process, can be determined according to the following equation:

$$\Delta CS' = \frac{R4 \times V_{FB\_sample}}{R151} \times \frac{1}{p} \qquad \text{(Equation 15)}$$

where ΔCS' represents the compensation value for the current-sensing signal 1532 and R4 represents the resistance of the resistor 432. For example, the voltage at the terminal 444 is equal to the current-sensing signal 1532 lowered by ΔCS' in magnitude. In another example, the current-sensing signal 1532 is proportional to the primary current 462 in magnitude.

In one embodiment, if certain error output current is taken into account but no compensation for the current-sensing signal 1532 (e.g., ΔCS' as shown in Equation 15) is taken into account, an average output current of the system 400 is determined according to the following equation:

$$\overline{I_o} = \frac{1}{2} \times N \times \frac{V_{ref\_ea}}{R_{cs}} + \Delta I_o(V_{out}) \qquad \text{(Equation 16)}$$

where N represents a turns ratio between the primary winding 412 and the secondary winding 414, $V_{ref\_ea}$ represents an internal reference signal (e.g., the reference signal 522, or the reference signal 622), $R_{cs}$ represents the resistance of the resistor 430, and $\Delta I_o(V_{out})$ represents an error current as a function of the output voltage 468 (e.g., $V_{out}$).

In another embodiment, if a compensation for the current-sensing signal 1532 (e.g., ΔCS' as shown in Equation 15) is also taken into account, the internal reference signal (e.g., the reference signal 522, or the reference signal 622) is effectively reduced by the same amount of compensation. For example, based on Equation 16, the following is obtained:

$$\overline{I_o} = \frac{1}{2} \times N \times \frac{V_{ref\_ea} + \Delta CS'}{R_{cs}} + \Delta I_o(V_{out}) \qquad \text{(Equation 17)}$$

Thus, under different output voltages, the average output current of the system 400 can be kept approximately constant by adjusting the compensation value ΔCS' for the current-sensing signal 1532 (e.g., by adjusting the resistances of the resistors 432 and 1516) according to certain embodiments.

Figure 16:
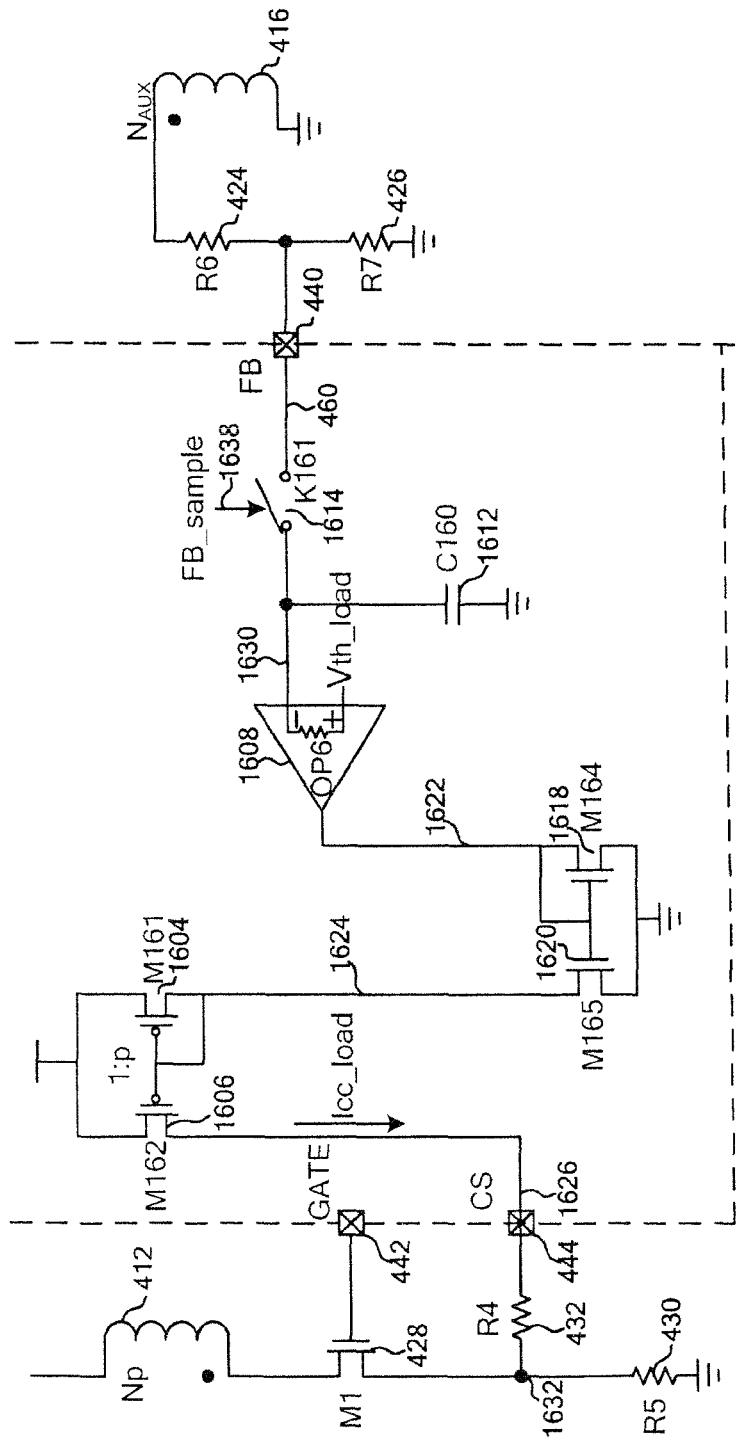
FIG. 16 is a simplified diagram showing certain components of the system as shown in FIG. 4 according to yet another embodiment of the present invention.

FIG. 16 is a simplified diagram showing certain components of the system 400 according to yet another embodiment of the present invention. This diagram is merely an example, which should not unduly limit the scope of the claims. One of ordinary skill in the art would recognize many variations, alternatives, and modifications. The controller 402 further includes transistors 1604, 1606, 1618 and 1620, a transconductance amplifier 1608, a capacitor 1612, and a switch 1614. For example, the load-compensation component 560 includes the resistor 432, the transistors 1604, 1606, 1618 and 1620, the transconductance amplifier 1608, the capacitor 1612, and the switch 1614. In another example, the load-compensation component 660 includes the resistor 432, the transistors 1604, 1606, 1618 and 1620, the transconductance amplifier 1608, the capacitor 1612, and the switch 1614.

According to one embodiment, if the switch 1614 is closed (e.g., being turned on) in response to a sampling signal 1638 during the demagnetization process of the secondary winding 414, the feedback signal 460 is sampled and held at the capacitor 1612. For example, the transconductance amplifier 1608 receives the sampled-and-held signal 1630 at an inverting input terminal (e.g., the "−" terminal as shown in FIG. 16) and a threshold signal 1610 (e.g., $V_{th\_load}$) at a non-inverting input terminal (e.g., the "+" terminal as shown in FIG. 16) and generates a current 1622 (e.g., $I_{gm}$). In another example, the sampled-and-held signal 1630 is determined according to the following equation:

$$V_{FB\_sample} = V_{out} \times N_{as} \qquad \text{(Equation 18)}$$

where $V_{FB\_sample}$ represents the sampled-and-held signal 1630, $V_{out}$ represents the output voltage 468, and $N_{as}$ represents the turns ratio between the auxiliary winding 416 and the secondary winding 414. In yet another example, before and/or after the demagnetization process of the secondary winding 414, the switch 1614 is opened (e.g., being turned off) in response to the sampling signal 1638. In yet another example, the sampling signal 1638 is the same as the signal 538. In yet another example, the sampling signal 1638 is the same as the signal 638.

According to another embodiment, a current-mirror circuit including the transistors 1504, 1506, 1518 and 1520 mirrors the current 1622 to generate a current 1624 that flows through the transistors 1604 and 1620, and mirrors the current 1624 to generate a compensation current 1626 (e.g., $I_{cc\_load}$). For example, the compensation current 1626 flows from the transistor 1606 to the resistor 432 through the terminal 444. In another example, during the demagnetization process, the compensation current 1626 is determined according to the following equation:

$$I_{CC\_load} = (V_{th\_local} - V_{FB\_sample}) \times g_m \times \frac{1}{p} \quad \text{(Equation 19)}$$

where $I_{CC\_load}$ represents the current 1626, $V_{FB\_sample}$ represents the sampled-and-held signal 1630, $g_m$ represents the transconductance of the amplifier 1608, and p represents a ratio associated with the current mirror circuit including the transistors 1604, 1606, 1618 and 1620. In another example, the compensation current 1626 (e.g., $I_{cc\_load}$) flows through the resistor 432 to provide a compensation value for a current-sensing signal 1632 which, during the demagnetization process, can be determined according to the following equation:

$$\Delta CS'' = R4 \times (V_{th\_local} - V_{FB\_sample}) \times g_m \times \frac{1}{p} \quad \text{(Equation 20)}$$

where ΔCS" represents the compensation value for the current-sensing signal 1632, and R4 represents the resistance of the resistor 432. For example, the voltage at the terminal 444 is equal to the current-sensing signal 1632 raised by ΔCS" in magnitude. In another example, the current-sensing signal 1632 is proportional to the primary current 462 in magnitude.

In one embodiment, if certain error output current is taken into account but no compensation for the current-sensing signal 1632 (e.g., ΔCS" as shown in Equation 20) is taken into account, an average output current of the system 400 is determined according to the following equation:

$$\overline{I_o} = \frac{1}{2} \times N \times \frac{V_{ref\_ea}}{R_{cs}} + \Delta I_o(V_{out}) \quad \text{(Equation 21)}$$

where N represents a turns ratio between the primary winding 412 and the secondary winding 414, $V_{ref\_ea}$ represents an internal reference signal (e.g., the reference signal 522, or the reference signal 622), $R_{cs}$ represents the resistance of the resistor 430, and $\Delta I_o(V_{out})$ represents an error current as a function of the output voltage 468 (e.g., $V_{out}$).

In another embodiment, if a compensation for the current-sensing signal 1632 (e.g., ΔCS" as shown in Equation 20) is also taken into account, the internal reference signal (e.g., the reference signal 522, or the reference signal 622) is effectively reduced by the same amount of compensation. For example, based on Equation 21, the following is obtained:

$$\overline{I_o} = \frac{1}{2} \times N \times \frac{V_{ref\_ea} - \Delta CS''}{R_{cs}} + \Delta I_o(V_{out}) \quad \text{(Equation 22)}$$

Thus, under different output voltages, the average output current of the system 400 can be kept approximately constant by adjusting the compensation value ΔCS" for the current-sensing signal 1632 (e.g., adjusting the resistance of the resistor 432), according to certain embodiments.

Figure 17:
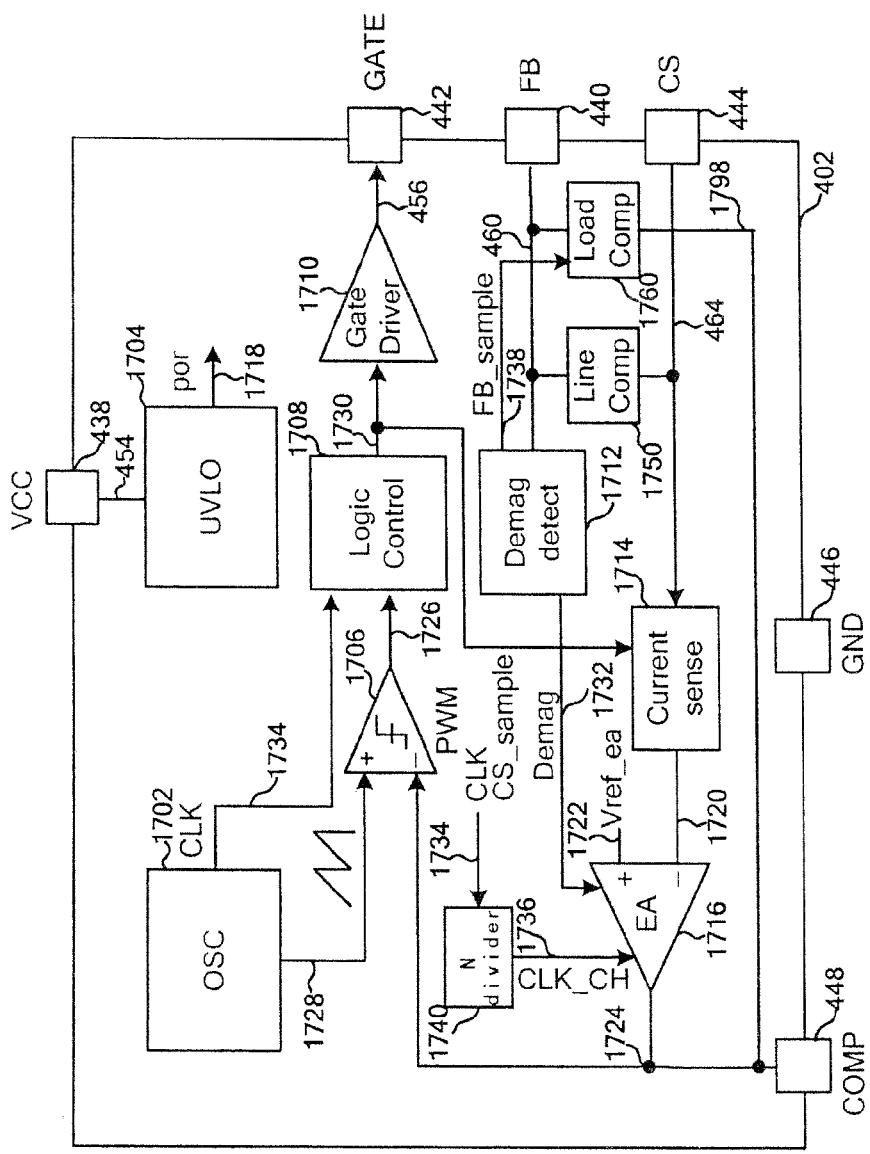
FIG. 17 is a simplified diagram showing a controller as part of the power conversion system as shown in FIG. 4 according to yet another embodiment of the present invention.

FIG. 17 is a simplified diagram showing the controller 402 as part of the power conversion system 400 according to yet another embodiment of the present invention. This diagram is merely an example, which should not unduly limit the scope of the claims. One of ordinary skill in the art would recognize many variations, alternatives, and modifications.

The controller 402 includes an oscillator 1702, an under-voltage lock-out (UVLO) component 1704, a modulation component 1706, a logic controller 1708, a driving component 1710, a demagnetization detector 1712, an error amplifier 1716, a current-sensing component 1714, and a chopping component 1740. In addition, the controller 402 includes at least part of a line-voltage-compensation component 1750 and at least part of a load-compensation component 1760. For example, the error amplifier 1716 is the same as the error amplifier 516. In another example, the line-voltage-compensation component 1750 is the same as the line-voltage-compensation component 550. In yet another example, the load-compensation component 1760 is the same as the load-compensation component 560.

According to one embodiment, the UVLO component 1704 detects the signal 454 and outputs a signal 1718. For example, if the signal 454 is larger than a predetermined threshold in magnitude, the controller 402 begins to operate normally. In another example, if the signal 454 is smaller than the predetermined threshold in magnitude, the controller 402 is turned off. In yet another example, the error amplifier 1716 receives a signal 1720 from the current-sensing component 1714 and a reference signal 1722 and outputs an amplified signal 1724 to the modulation component 1706. In yet another example, the modulation component 1706 also receives a signal 1728 from the oscillator 1702 and outputs a modulation signal 1726. In yet another example, the signal 1728 is a ramping signal and increases, linearly or non-linearly, to a peak magnitude during each switching period. In yet another example, the modulation signal 1726 is a pulse-width-modulation (PWM) signal with a fixed switching frequency and the duty cycle of the signal 1726 is determined based on a comparison between the signal 1724 and the signal 1728. In yet another example, the logic controller 1708 processes the modulation signal 1726 and outputs a control signal 1730 to the driving component 1710 which generates the signal 456 to turn on or off the switch 428. In yet another example, the logic controller 1708 also outputs the control signal 1730 to the current sensing component 1714.

According to another embodiment, the control signal 456 is at a logic high level if the control signal 1730 is at a logic high level. For example, the control signal 456 is at a logic low level if the control signal 1730 is at a logic low level. In another example, the demagnetization detector 1712 detects the feedback signal 460 and outputs a demagnetization signal 1732 for determining the beginning and the end of the demagnetization process of the secondary winding 414 during each switching period. In yet another example, the demagnetization signal 1732 is at a logic high level during the demagnetization period of each switching cycle, and at a logic low level during the rest of each switching cycle. In yet another example, the demagnetization signal 1732 changes from the logic low level to the logic high level if the control signal 456 changes from the logic high level to the logic low level. In yet another example, the demagnetization detector 1712 outputs a sampling signal 1738 to the load-compensation component 1760 which outputs a compensation signal 1798 to affect the output of the error amplifier 1716.

According to yet another embodiment, the chopping component 1740 receives a clock signal 1734 from the oscillator 1702 and outputs a signal 1736 to the error amplifier 1716. For example, the signal 1736 is also a clock signal that has a 50% duty cycle and a frequency which is 1/N of the frequency of the clock signal 1734. In another example, the signal 1736 is used for chopping the error amplifier 1716. In yet another example, the line-voltage-compensation component 1750 is used for keeping the output current approximately constant (e.g., with a small error) under a wide range of input line voltages. In yet another example, the load-compensation component 1760 is used for keeping the output current approximately constant (e.g., with a small error) under a wide range of output voltages.

As discussed above and further emphasized here, FIG. 17 is merely an example, which should not unduly limit the scope of the claims. One of ordinary skill in the art would recognize many variations, alternatives, and modifications. For example, the current-sensing component 1714 is the same as the current-sensing component 214. In another example, the error amplifier 1716 can be replaced by the error amplifier 216. In some embodiments, the line-voltage-compensation component 1750 is removed. In certain embodiments, the load-compensation component 1760 is removed.

Figure 18:
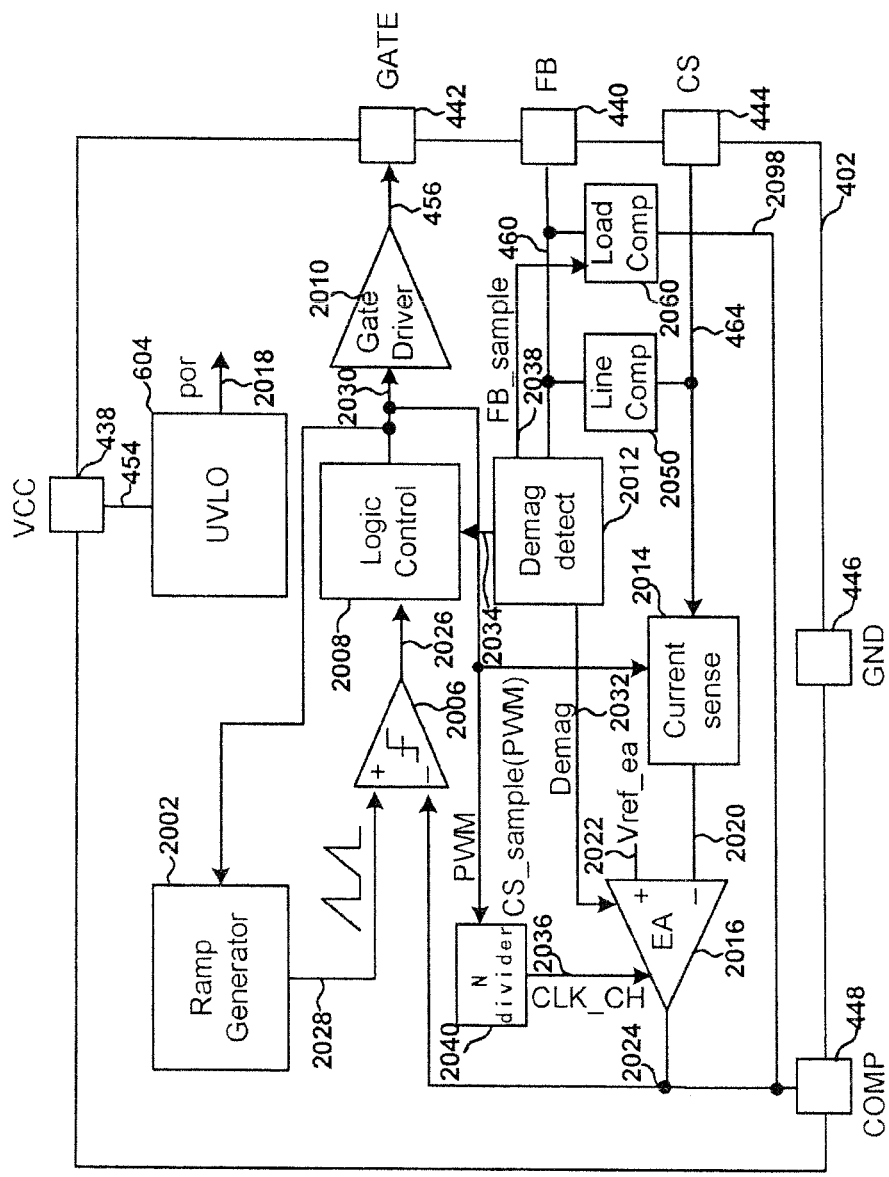
FIG. 18 is a simplified diagram showing a controller as part of the power conversion system as shown in FIG. 4 according to yet another embodiment of the present invention.

FIG. 18 is a simplified diagram showing the controller 402 as part of the power conversion system 400 according to yet another embodiment of the present invention. This diagram is merely an example, which should not unduly limit the scope of the claims. One of ordinary skill in the art would recognize many variations, alternatives, and modifications.

The controller 402 includes a ramp-signal generator 2002, an under-voltage lock-out (UVLO) component 2004, a modulation component 2006, a logic controller 2008, a driving component 2010, a demagnetization detector 2012, an error amplifier 2016, a current-sensing component 2014, and a chopping component 2040. In addition, the controller 402 includes at least part of a line-voltage-compensation component 2050 and at least part of a load-compensation component 2060. For example, the error amplifier 2016 is the same as the error amplifier 616. In another example, the line-voltage-compensation component 2050 is the same as the line-voltage-compensation component 650. In yet another example, the load-compensation component 2060 is the same as the load-compensation component 660.

According to one embodiment, the UVLO component 2004 detects the signal 454 and outputs a signal 2018. For example, if the signal 454 is larger than a predetermined threshold in magnitude, the controller 402 begins to operate normally. In another example, if the signal 454 is smaller than the predetermined threshold in magnitude, the controller 402 is turned off. In yet another example, the error amplifier 2016 receives a signal 2020 from the current-sensing component 2014 and a reference signal 2022 and outputs an amplified signal 2024 to the modulation component 2006. In yet another example, the modulation component 2006 also receives a signal 2028 from the ramp-signal generator 2002 and outputs a modulation signal 2026. In yet another example, the signal 2028 is a ramping signal and increases, linearly or non-linearly, to a peak magnitude during each switching period. In yet another example, the modulation signal 2026 does not have a fixed switching frequency. In yet another example, the logic controller 2008 processes the modulation signal 2026 and outputs a control signal 2030 to the driving component 2010 which generates the signal 456 to turn on or off the switch 428. In yet another example, the logic controller 2008 also outputs the control signal 2030 to the current sensing component 2014.

According to another embodiment, the control signal 456 is at a logic high level if the control signal 2030 is at a logic high level. For example, the control signal 456 is at a logic low level if the control signal 2030 is at a logic low level. In another example, the demagnetization detector 2012 detects the feedback signal 2060 and outputs a demagnetization signal 2032 for determining the beginning and the end of the demagnetization process of the secondary winding 414 during each switching period. In yet another example, the demagnetization signal 2032 is at a logic high level during the demagnetization period of each switching cycle, and at a logic low level during the rest of each switching cycle. In yet another example, the demagnetization signal 2032 changes from the logic low level to the logic high level if the control signal 456 changes from the logic high level to the logic low level. In yet another example, the demagnetization detector 2012 outputs a sampling signal 2038 to the load-compensation component 2060 which outputs a compensation signal 2098 to affect the output of the error amplifier 2016. In yet another example, the ramp-signal generator 2002 receives the control signal 2030 and outputs the signal 2028 to the modulation component 2006.

According to yet another embodiment, the chopping component 2040 receives the control signal 2030 from the logic controller 2008 and outputs a signal 2036 to the error amplifier 2016. For example, the signal 2036 is a clock signal that has a 50% duty cycle and a frequency which is 1/N of the frequency of the control signal 2030. In another example, the signal 2036 is used for chopping the error amplifier 2016. In yet another example, the line-voltage-compensation component 2050 is used for keeping the precision of the constant output current within a wide range of input line voltages. In yet another example, the load-compensation component 2060 is used for keeping the precision of the constant output current within a wide range of output voltages.

As discussed above and further emphasized here, FIG. 18 is merely an example, which should not unduly limit the scope of the claims. One of ordinary skill in the art would recognize many variations, alternatives, and modifications. For example, the current-sensing component 2014 is the same as the current-sensing component 214. In another example, the error amplifier 2016 can be replaced by the error amplifier 216. In some embodiments, the line-voltage-compensation component 2050 is removed. In certain embodiments, the load-compensation component 2060 is removed.

Figure 19:
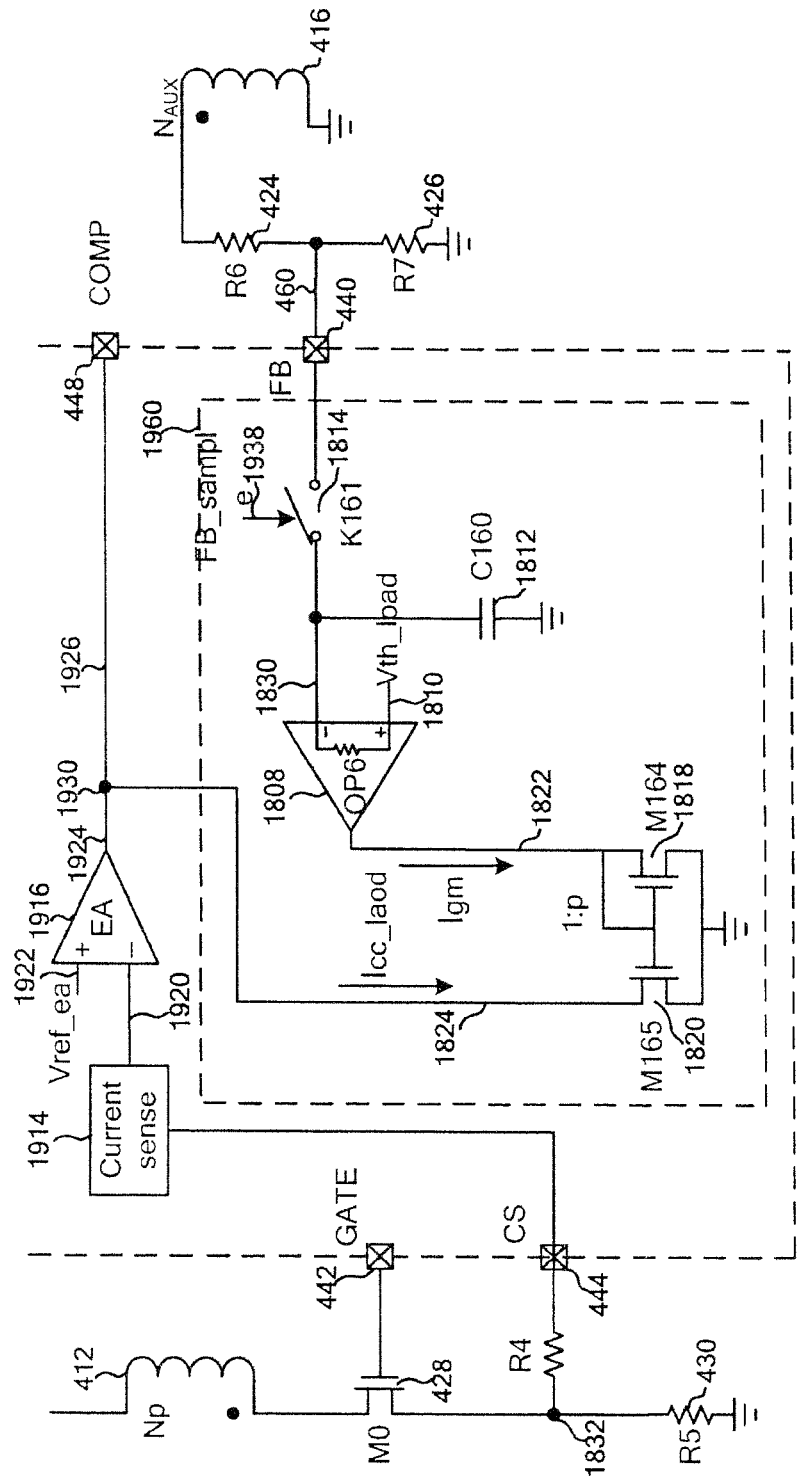
FIG. 19 is a simplified diagram showing certain components of the system as shown in FIG. 4 according to yet another embodiment of the present invention.

FIG. 19 is a simplified diagram showing certain components of the system 400 according to yet another embodiment of the present invention. This diagram is merely an example, which should not unduly limit the scope of the claims. One of ordinary skill in the art would recognize many variations, alternatives, and modifications.

The controller 402 includes a load-compensation component 1960, a current-sensing component 1914, and an error amplifier 1916. The load-compensation component 1960 includes transistors 1818 and 1820, a transconductance amplifier 1808, a capacitor 1812, and a switch 1814. For example, the load-compensation component 1960 is the same as the load-compensation component 1760. In another example, the load-compensation component 1960 is the same as the load-compensation component 2060. In yet another example, the current-sensing component 1914 is the same as the current-sensing component 1714. In yet another example, the current-sensing component 1914 is the same as the current-sensing component 2014. In yet another example, the error amplifier 1916 is the same as the error amplifier 1716. In yet another example, the error amplifier 1916 is the same as the error amplifier 2016.

According to one embodiment, an output current 1924 of the error amplifier 1916 is related to a difference between a reference signal 1922 and an output signal 1920 generated by the current sensing component 1914. For example, the output current 1924 of the error amplifier 1916 is proportional to a difference between the reference signal 1922 and the output signal 1920 in magnitude.

According to another embodiment, if the switch 1814 is closed (e.g., being turned on) in response to the sampling signal 1938 during the demagnetization process of the secondary winding 414, the feedback signal 460 is sampled and held at the capacitor 1812. For example, the transconductance amplifier 1808 receives the sampled-and-held signal 1830 at an inverting input terminal (e.g., the "−" terminal as shown in FIG. 19) and a threshold signal 1810 (e.g., $V_{th\_load}$) at a non-inverting input terminal (e.g., the "+" terminal as shown in FIG. 19) and generates a current 1822 (e.g., $I_{gm}$). In another example, the sampled-and-held signal 1830 is determined according to the following equation:

$$V_{FB\_sample} = V_{out} \times N_{as} \quad \text{(Equation 23)}$$

where $V_{FB\_sample}$ represents the sampled-and-held signal 1830, $V_{out}$ represents the output voltage 468, and $N_{as}$ represents the turns ratio between the auxiliary winding 416 and the secondary winding 414. In yet another example, before and/or after the demagnetization process of the secondary winding 414, the switch 1814 is opened (e.g., being turned off) in response to the sampling signal 1938. In yet another example, the sampling signal 1938 is the same as the signal 1738. In yet another example, the sampling signal 1938 is the same as the signal 2038.

According to yet another embodiment, a current-mirror circuit including the transistors 1818 and 1820 mirrors the current 1822 to generate a compensation current 1824 (e.g., $I_{cc\_load}$). For example, the current-mirror circuit is coupled to the error amplifier 1916 at a circuit node 1930, and the output current 1924 is divided into the compensation current 1824 and a current 1926. In one embodiment, the output current 1924 flows from the error amplifier 1916 to the circuit node 1930, the compensation current flows from the circuit node 1930 to the transistor 1820, and the current 1926 flows from the circuit node 1930 to the terminal 448. In another embodiment, the current 1926 is equal to the output current 1924 minus the compensation current 1824 in magnitude.

According to yet another embodiment, during the demagnetization process, the compensation current 1824 is determined according to the following equation:

$$I_{CC\_load} = (V_{th\_load} - V_{FB\_sample}) \times g_m \times \frac{1}{p} \quad \text{(Equation 24)}$$

where $I_{CC\_load}$ represents the current 1824, $V_{FB\_sample}$ represents the sampled-and-held signal 1830, $g_m$ represents the transconductance of the amplifier 1808, and p represents a ratio associated with the current mirror circuit including the transistors 1818 and 1820. For example, the effect of the compensation current 1824 (e.g., $I_{cc\_load}$) on the error amplifier 1916, during the demagnetization process, is approximately equivalent to generating a compensation value of a reference signal 1922 (e.g., $V_{ref\_ea}$). In another example, the compensation value of the reference signal 1922 is determined according to the following equation:

$$\Delta V_{ref\_ea} = \frac{1}{g_{m\_ea}} \times (V_{th\_load} - V_{FB\_sample}) \times g_m \times \frac{1}{p} \quad \text{(Equation 25)}$$

where $\Delta V_{ref\_ea}$ represents the compensation value for the reference signal 1922, and $g_{m\_ea}$ represents a transconductance of the error amplifier 1916.

In one embodiment, if certain error output current is taken into account but no compensation for the reference signal 1922 (e.g., $V_{ref\_ea}$) (e.g., $\Delta V_{ref\_ea}$ as shown in Equation 25) is taken into account, an average output current of the system 400 is determined according to the following equation:

$$\overline{I_o} = \frac{1}{2} \times N \times \frac{V_{ref\_ea}}{R_{cs}} + \Delta I_o(V_{out}) \quad \text{(Equation 26)}$$

where N represents a turns ratio between the primary winding 412 and the secondary winding 414, $V_{ref\_ea}$ represents the reference signal 1922, $R_{cs}$ represents the resistance of the resistor 430, and $\Delta I_o(V_{out})$ represents an error current as a function of the output voltage 468 (e.g., $V_{out}$).

In another embodiment, if a compensation for the reference signal 1922 (e.g., $V_{ref\_ea}$) (e.g., $\Delta V_{ref\_ea}$ as shown in Equation 25) is also taken into account, an average output current of the system 400 is determined according to the following equation:

$$\overline{I_o} = \frac{1}{2} \times N \times \frac{V_{ref\_ea} + \Delta V_{ref\_ea}}{R_{cs}} + \Delta I_o(V_{out}) \quad \text{(Equation 27)}$$

Thus, under different output voltages, the average output current of the system 400 can be kept approximately constant by adjusting the compensation value (e.g., $\Delta V_{ref\_ea}$) for the reference signal 1922 (e.g., adjusting the ratio between the resistance of the resistor 424 and the resistance of the resistor 426), according to certain embodiments.

According to another embodiment, an error amplifier for processing a reference signal and an input signal associated with a current of a power conversion system includes a first operational amplifier, a second operational amplifier, a first transistor, a second transistor, a current mirror component, a switch, a first resistor and a second resistor. The first operational amplifier includes a first input terminal, a second input terminal and a first output terminal, the first input terminal being configured to receive a reference signal. The first transistor includes a first transistor terminal, a second transistor terminal and a third transistor terminal, the first transistor terminal being configured to receive a first amplified signal from the first output terminal, the third transistor terminal being coupled to the second input terminal. The second operational amplifier includes a third input terminal, a fourth input terminal and a second output terminal, the third input terminal being configured to receive an input signal associated with a current flowing through a primary winding of a power conversion system. The second transistor includes a fourth transistor terminal, a fifth transistor terminal and a sixth transistor terminal, the fourth transistor terminal being configured to receive a second amplified signal from the second output terminal, the sixth transistor terminal being coupled to the fourth input terminal. The current mirror component includes a first component terminal and a second component terminal, the first component terminal being coupled to the second transistor terminal. The switch includes a first switch terminal and a second switch terminal, the first switch terminal being coupled to the second component terminal, the second switch terminal being coupled to the fifth transistor terminal. The first resistor includes a first resistor terminal and a second resistor terminal, the first resistor being associated with a first resistance, the first resistor terminal being coupled to the second input terminal. The second resistor includes a third resistor terminal and a fourth resistor terminal, the second resistor being associated with a second resistance, the third resistor terminal being coupled to the fourth input terminal. The first resistance is larger than the second resistance in magnitude. The second component terminal is configured to output an output signal based on at least information associated with the reference signal and the input signal. For example, the error amplifier is implemented according to at least FIG. 7, FIG. 8, FIG. 9, FIG. 10, and/or FIG. 11.

According to another embodiment, a system controller for regulating a power conversion system includes a first controller terminal configured to receive a first voltage associated with a first current, the first current being related to an input voltage of a power conversion system, a compensation component coupled to the first controller terminal and configured to, if the first voltage satisfies one or more first conditions, generate a compensation current based on at least information associated with the first current, and a second controller terminal coupled to the compensation component and configured to provide a compensation voltage based on at least information associated with the compensation current, the compensation voltage being equal in magnitude to the compensation current multiplied by a compensation resistance, the compensation resistance being associated with a compensation resistor. The system controller further includes a current sensing component configured to receive a second voltage and generate an output signal, the second voltage being equal to a sum of a third voltage and the compensation voltage in magnitude, the third voltage being proportional to a second current flowing through a primary winding of the power conversion system, and an error amplifier configured to receive the output signal and a reference signal, generate an amplified signal based on at least information associated with the output signal and the reference signal, and output the amplified signal to affect a switch associated with the second current. For example, the system controller is implemented according to at least FIG. 13.

According to yet another embodiment, a system controller for regulating a power conversion system includes a first controller terminal configured to receive a feedback signal associated with an output voltage of a power conversion system, a compensation component coupled to the first controller terminal and configured to sample the feedback signal during a demagnetization process of the power conversion system and generate a compensation current based on at least information associated with the sampled feedback signal, and a second controller terminal coupled to the compensation component and configured to provide a compensation voltage based on at least information associated with the compensation current, the compensation voltage being equal in magnitude to the compensation current multiplied by a compensation resistance, the compensation resistance being associated with a compensation resistor. In addition, the system controller includes a current sensing component configured to receive an input voltage and generate an output signal, the input voltage being equal to a sum of a first voltage and the compensation voltage in magnitude, the first voltage being proportional to a first current flowing through a primary winding of the power conversion system, and an error amplifier configured to receive the output signal and a reference signal, generate an amplified signal based on at least information associated with the output signal and the reference signal, and output the amplified signal to affect a switch associated with the first current. For example, the system controller is implemented according to at least FIG. 15, and/or FIG. 16.

According to yet another embodiment, a system controller for regulating a power conversion system includes a first controller terminal configured to receive a feedback signal associated with an output voltage of a power conversion system, a compensation component coupled to the first controller terminal and configured to sample the feedback signal during a demagnetization process of the power conversion system and generate a compensation current based on at least information associated with the sampled feedback signal, and an error amplifier including a first input terminal, a second input terminal, and an output terminal coupled to the compensation component. The first input terminal is configured to receive an input voltage, the second input terminal is configured to receive a reference voltage, and the output terminal is configured to output a first output current related to a difference between the input voltage and the reference voltage in magnitude. The error amplifier and the compensation component are further configured to generate a second output current equal to a difference between the first output current and the compensation current in magnitude. For example, the system controller is implemented according to at least FIG. 19.

In one embodiment, a method for regulating a power conversion system includes receiving a first voltage associated with a first current, the first current being related to an input voltage of a power conversion system, generating, if the first voltage satisfies one or more first conditions, a compensation current based on at least information associated with the first current, and providing an compensation voltage based on at least information associated with the compensation current, the compensation voltage being equal in magnitude to the compensation current multiplied by a compensation resistance, the compensation resistance being associated with a compensation resistor. The method further includes receiving an input voltage, the input voltage being equal to a sum of a second voltage and the compensation voltage in magnitude, the second voltage being proportional to a second current flowing through a primary winding of the power conversion system, generating an output signal based on at least information associated with the input voltage, and receiving the output signal and a reference signal. In addition, the method includes generating an amplified signal based on at least information associated with the output signal and the reference signal, and outputting the amplified signal in order to affect a switch associated with the second current. For example, the method is implemented according to at least FIG. 13.

In another embodiment, a method for regulating a power conversion system includes receiving a feedback signal associated with an output voltage of a power conversion system, sampling the feedback signal during a demagnetization process of the power conversion system, and generating a compensation current based on at least information associated with the sampled feedback signal. The method further includes providing a compensation voltage based on at least information associated with the compensation current, the compensation voltage being equal in magnitude to the compensation current multiplied by a compensation resistance, the compensation resistance being associated with a compensation resistor, receiving an input voltage, the input voltage being equal to a sum of a first voltage and the compensation voltage in magnitude, the first voltage being proportional to a first current flowing through a primary winding of the power conversion system, and generating an output signal. In addition, the method includes receiving the output signal and a reference signal, generating an amplified signal based on at least information associated with the output signal and the reference signal, and outputting the amplified signal to affect a switch associated with the first current. For example, the method is implemented according to at least FIG. 15 and/or FIG. 16.

In yet another embodiment, a method for regulating a power conversion system includes receiving a feedback signal associated with an output voltage of a power conversion system, sampling the feedback signal during a demagnetization process of the power conversion system, and generating a compensation current based on at least information associated with the sampled feedback signal. Additionally, the method includes receiving an input voltage at a first input terminal of an error amplifier, and the error amplifier further includes a second input terminal and an output terminal. Moreover, the method includes receiving a reference voltage at the second input terminal, generating a first output current at the output terminal related to a difference between the input voltage and the reference voltage in magnitude, and outputting a second output current equal to a difference between the first output current and the compensation current in magnitude. For example, the method is implemented according to at least FIG. 19.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for regulating a power conversion system, the system controller comprising:
   a first controller terminal configured to receive a first voltage associated with a first current, the first current being related to an input voltage of a power conversion system;
   a compensation component coupled to the first controller terminal and configured to, if the first voltage satisfies one or more first conditions, generate a compensation current based on at least information associated with the first current;
   a second controller terminal coupled to the compensation component and configured to provide a compensation voltage based on at least information associated with the compensation current, the compensation voltage being equal in magnitude to the compensation current multiplied by a compensation resistance, the compensation resistance being associated with a compensation resistor;
   a current sensing component configured to receive a second voltage and generate a first output signal, the second voltage being equal to a sum of a third voltage and the compensation voltage in magnitude, the third voltage being proportional to a second current flowing through a primary winding of the power conversion system; and
   an error amplifier configured to receive the first output signal and a first reference signal, generate an amplified signal based on at least information associated with the first output signal and the first reference signal, and output the amplified signal to affect a switch associated with the second current.

2. The system controller of claim 1 wherein the one or more first conditions are satisfied if the first voltage is approximately equal to a ground voltage.

3. The system controller of claim 1 wherein the first controller terminal is coupled to a first resistor terminal of a first resistor, the first resistor further including a second resistor terminal biased to a ground voltage.

4. The system controller of claim 3 wherein the first controller terminal is coupled to a third resistor terminal of a second resistor, the second resistor further including a fourth resistor terminal coupled to an auxiliary winding of the power conversion system.

5. The system controller of claim 1 wherein the second controller terminal is coupled to the compensation resistor.

6. The system controller of claim 1 wherein the error amplifier includes:
   a first operational amplifier including a first input terminal, a second input terminal and a first output terminal, the first input terminal being configured to receive the first reference signal;
   a first transistor including a first transistor terminal, a second transistor terminal and a third transistor terminal, the first transistor terminal being coupled to the first output terminal, the third transistor terminal being coupled to the second input terminal;
   a second operational amplifier including a third input terminal, a fourth input terminal and a second output terminal, the third input terminal being configured to receive the first output signal;
   a second transistor including a fourth transistor terminal, a fifth transistor terminal and a sixth transistor terminal, the fourth transistor terminal being coupled to the second output terminal, the sixth transistor terminal being coupled to the fourth input terminal;
   a current mirror component including a first component terminal and a second component terminal, the first component terminal being coupled to the second transistor terminal;
   a switch including a first switch terminal and a second switch terminal, the first switch terminal being coupled to the second component terminal, the second switch terminal being coupled to the fifth transistor terminal;
   a first resistor including a first resistor terminal and a second resistor terminal, the first resistor being associated with a first resistance, the first resistor terminal being coupled to the second input terminal; and
   a second resistor including a third resistor terminal and a fourth resistor terminal, the second resistor being associated with a second resistance, the third resistor terminal being coupled to the fourth input terminal;

wherein:
the first output terminal is configured to output a second output signal to the first transistor terminal;
the second output terminal is configured to output a third output signal to the fourth transistor terminal; and
the first resistance is larger than the second resistance in magnitude.

7. The system controller of claim 1 wherein:
the first controller terminal is configured to receive a feedback signal associated with an output voltage of the power conversion system;
a load-compensation component is configured to sample the feedback signal during a demagnetization process of the power conversion system and generate a third current based on at least information associated with the sampled feedback signal;
the error amplifier includes a first input terminal, a second input terminal, and an output terminal coupled to the load-compensation component, the first input terminal being configured to receive a fourth voltage, the second input terminal being configured to receive a second reference signal, the output terminal being configured to output an output current;
the output current is equal to a difference between an amplified current and the third current in magnitude; and
the amplified current is related to a difference between the fourth voltage and the second reference signal in magnitude.

8. The system controller of claim 1 wherein the compensation component includes:
an operational amplifier including a first input terminal, a second input terminal, and an output terminal;
a first transistor including a first transistor terminal, a second transistor terminal, and a third transistor terminal; and
a current mirror component including a first component terminal and a second component terminal;
wherein:
the first input terminal is biased to a ground voltage;
the second input terminal is coupled to the first controller terminal and the third transistor terminal;
the output terminal is coupled to the first transistor terminal;
the second transistor terminal is coupled to the second component terminal; and
the first component terminal is coupled to the second controller terminal.

9. A system controller for regulating a power conversion system, the system controller comprising:
a first controller terminal configured to receive a feedback signal associated with an output voltage of a power conversion system;
a compensation component coupled to the first controller terminal and configured to sample the feedback signal during a demagnetization process of the power conversion system and generate a compensation current based on at least information associated with the sampled feedback signal;
a second controller terminal coupled to the compensation component and configured to provide a compensation voltage based on at least information associated with the compensation current, the compensation voltage being equal in magnitude to the compensation current multiplied by a compensation resistance, the compensation resistance being associated with a compensation resistor;
a current sensing component configured to receive an input voltage and generate a first output signal, the input voltage being equal to a sum of a first voltage and the compensation voltage in magnitude, the first voltage being proportional to a first current flowing through a primary winding of the power conversion system; and
an error amplifier configured to receive the first output signal and a reference signal, generate an amplified signal based on at least information associated with the first output signal and the reference signal, and output the amplified signal to affect a switch associated with the first current.

10. The system controller of claim 9 wherein the first controller terminal is coupled to a first resistor terminal of a first resistor, the first resistor further including a second resistor terminal biased to a ground voltage.

11. The system controller of claim 10 wherein the first controller terminal is coupled to a third resistor terminal of a second resistor, the second resistor further including a fourth resistor terminal coupled to an auxiliary winding of the power conversion system.

12. The system controller of claim 9 wherein the second controller terminal is coupled to the compensation resistor.

13. The system controller of claim 9 wherein the error amplifier includes:
a first operational amplifier including a first input terminal, a second input terminal and a first output terminal, the first input terminal being configured to receive the reference signal;
a first transistor including a first transistor terminal, a second transistor terminal and a third transistor terminal, the first transistor terminal being coupled to the first output terminal, the third transistor terminal being coupled to the second input terminal;
a second operational amplifier including a third input terminal, a fourth input terminal and a second output terminal, the third input terminal being configured to receive the first output signal;
a second transistor including a fourth transistor terminal, a fifth transistor terminal and a sixth transistor terminal, the fourth transistor terminal being coupled to the second output terminal, the sixth transistor terminal being coupled to the fourth input terminal;
a current mirror component including a first component terminal and a second component terminal, the first component terminal being coupled to the second transistor terminal;
a switch including a first switch terminal and a second switch terminal, the first switch terminal being coupled to the second component terminal, the second switch terminal being coupled to the fifth transistor terminal;
a first resistor including a first resistor terminal and a second resistor terminal, the first resistor being associated with a first resistance, the first resistor terminal being coupled to the second input terminal; and
a second resistor including a third resistor terminal and a fourth resistor terminal, the second resistor being associated with a second resistance, the third resistor terminal being coupled to the fourth input terminal;
wherein:
the first output terminal is configured to output a second output signal to the first transistor terminal;

the second output terminal is configured to output a third output signal to the fourth transistor terminal; and the first resistance is larger than the second resistance in magnitude.

14. The system controller of claim 9 wherein the compensation component includes:
- an operational amplifier including a first input terminal, a second input terminal, and an output terminal;
- a first transistor including a first transistor terminal, a second transistor terminal, and a third transistor terminal;
- a sample-and-hold component including a first component terminal and a second component terminal; and
- a current mirror component including a third component terminal and a fourth component terminal;

wherein:
- the first component terminal is coupled to the first controller terminal;
- the second component terminal is coupled to the first input terminal;
- the second input terminal is coupled to the third transistor terminal;
- the output terminal is coupled to the first transistor terminal;
- the second transistor terminal is coupled to the fourth component terminal; and
- the third component terminal is coupled to the second controller terminal.

15. A method for regulating a power conversion system, the method comprising:
- receiving a first voltage associated with a first current, the first current being related to an input voltage of a power conversion system;
- generating, if the first voltage satisfies one or more first conditions, a compensation current based on at least information associated with the first current;
- providing a compensation voltage based on at least information associated with the compensation current, the compensation voltage being equal in magnitude to the compensation current multiplied by a compensation resistance, the compensation resistance being associated with a compensation resistor;
- receiving the input voltage, the input voltage being equal to a sum of a second voltage and the compensation voltage in magnitude, the second voltage being proportional to a second current flowing through a primary winding of the power conversion system;
- generating an output signal based on at least information associated with the input voltage;
- receiving the output signal and a reference signal;
- generating an amplified signal based on at least information associated with the output signal and the reference signal; and
- outputting the amplified signal in order to affect a switch associated with the second current.

16. A method for regulating a power conversion system, the method comprising:
- receiving a feedback signal associated with an output voltage of a power conversion system;
- sampling the feedback signal during a demagnetization process of the power conversion system;
- generating a compensation current based on at least information associated with the sampled feedback signal;
- providing a compensation voltage based on at least information associated with the compensation current, the compensation voltage being equal in magnitude to the compensation current multiplied by a compensation resistance, the compensation resistance being associated with a compensation resistor;
- receiving an input voltage, the input voltage being equal to a sum of a first voltage and the compensation voltage in magnitude, the first voltage being proportional to a first current flowing through a primary winding of the power conversion system;
- generating an output signal;
- receiving the output signal and a reference signal;
- generating an amplified signal based on at least information associated with the output signal and the reference signal; and
- outputting the amplified signal to affect a switch associated with the first current.

* * * * *